US007808493B2

(12) United States Patent
Hashimoto et al.

(10) Patent No.: US 7,808,493 B2
(45) Date of Patent: Oct. 5, 2010

(54) DISPLAYING APPARATUS USING DATA LINE DRIVING CIRCUIT AND DATA LINE DRIVING METHOD

(75) Inventors: Yoshiharu Hashimoto, Kanagawa (JP); Takayuki Shu, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 809 days.

(21) Appl. No.: 11/802,050

(22) Filed: May 18, 2007

(65) Prior Publication Data

US 2007/0268233 A1 Nov. 22, 2007

(30) Foreign Application Priority Data

May 19, 2006 (JP) ............................ 2006-140642

(51) Int. Cl.
*G06F 3/038* (2006.01)

(52) U.S. Cl. ............................ 345/204; 345/87; 345/99

(58) Field of Classification Search ........... 345/87-102, 345/204
See application file for complete search history.

(56) References Cited

U.S. PATENT DOCUMENTS 7,123,227 B2 * 10/2006 Azami ......................... 345/89
7,268,756 B2 * 9/2007 Koyama et al. ............... 345/87
7,495,650 B2 * 2/2009 Murade ...................... 345/103
2001/0017618 A1 * 8/2001 Azami ........................ 345/204
2002/0011984 A1 * 1/2002 Shirochi et al. ............... 345/96
2003/0071779 A1 4/2003 Lee et al.
2003/0214476 A1 * 11/2003 Matsuda et al. ............. 345/100
2004/0041764 A1 * 3/2004 Koyama et al. ............... 345/87
2005/0088387 A1 * 4/2005 Yokoyama et al. ............ 345/87
2005/0140633 A1 6/2005 Kato
2005/0206608 A1 * 9/2005 Murade ...................... 345/103
2005/0243043 A1 * 11/2005 Jeoung et al. ................ 345/87
2006/0284903 A1 * 12/2006 Ng ............................ 345/691

FOREIGN PATENT DOCUMENTS

| | | |
|---|---|---|
| CN | 1412737 | 4/2003 |
| CN | 1617016 | 5/2005 |
| JP | 11-327518 | 11/1999 |
| JP | 2000-267616 | 9/2000 |
| JP | 2003-337320 | 11/2003 |
| JP | 2004-309822 | 11/2004 |

OTHER PUBLICATIONS

Chinese Office Actin dated Apr. 22, 2010, with English translation.

* cited by examiner

*Primary Examiner*—Nitin Patel
(74) *Attorney, Agent, or Firm*—McGinn IP Law Group, PLLC

(57) ABSTRACT

A data line driving circuit includes a first buffer circuit configured to drive a data line, and a second buffer circuit configured to drive a data line. N first data lines (n is a natural number larger than 1), and m second data lines (m is a natural number larger than 1) are alternately arranged in units of data lines as a group. The data line driving circuit further includes a first switch circuit configured to select one of the n first data lines in a first ON period and to connect the selected first data line with the first buffer circuit, and a second switch circuit configured to select one of the m second data lines adjacent to the selected first data line in a second ON period and to connect the selected second data line with the second buffer circuit.

22 Claims, 14 Drawing Sheets

DISPLAYING APPARATUS USING DATA LINE DRIVING CIRCUIT AND DATA LINE DRIVING METHOD

BACKGROUND OF THE INVENTION

1. Field of the Invention

The present invention relates to a display apparatus, and more particularly relates to a display apparatus with a data line driving circuit, and a data line driving method.

2. Description of Related Art

A time division drive, in which a plurality of data lines are sequentially selected and consequently display signals are written into pixels, is one of techniques that are widely used for a display apparatus. A merit of the time division drive is to make it possible to reduce the number of the buffers provided in a driver IC. The display apparatus that employs the time division drive can drive the pixels by using the buffers whose number is smaller than the number of the data lines on a panel. This is effective for decreasing the electric power consumption and chip area of the driver IC.

The display apparatus of an active matrix type uses a TFT (Thin Film Transistor) as a time divisional switching element on a panel substrate in many cases. The TFT is classified into two types of an amorphous TFT and a polycrystalline TFT. The polycrystalline TFT is known to be higher in mobility than the amorphous TFT. For this reason, since the size of the time divisional switch mounted on the panel substrate can be made small, the time division drive is applied to the display apparatus, which uses the polycrystalline TFT in many cases.

A conventional technique in which a time divisional switch and a shift register are provided on a panel substrate and a time division drive is performed is described in Japanese Laid Open Patent Application (JP-A-Heisei 11-327518: first conventional example). Also, a conventional technique in which a capacitance coupling between data lines adjacent to each other is reduced to suppress the display unevenness such as ghost and longitudinal stripe is described in Japanese Laid Open Patent Applications (JP-P2000-267616A and JP-P2003-337320A: second and third conventional examples). The second conventional example describes the technique to control such that a part of the ON periods of time divisional switches connected to data lines adjacent to each other is overlapped to reduce the capacitance coupling between the data lines adjacent to each other. The third conventional example describes the technique in which an impedance wiring, which is lower in resistance than a data line, is connected to the capacitance coupling between the data lines adjacent to each other, to reduce the capacitance coupling between the data lines.

Moreover, two sets of time divisional switch groups are provided to which the display signals of different systems are supplied. ON periods of the time divisional switch groups adjacent to each other are controlled so as not to overlap with each other, in each of the two sets of the time divisional switch groups, and the display unevenness is consequently controlled, in Japanese Laid Open Patent Application (JP-P2004-309822A: fourth conventional example).

When the driver IC in which the time divisional switches are provided is mounted on the panel substrate, the long side of the driver IC is shorter than a corresponding side of a pixel region in which the pixels are arranged. Therefore, it is required to provide wirings between the output terminal of the driver IC and the pixel region. At this time, in order to avoid use of a large size glass substrate because of the wirings, a pitch between the respective wirings is designed to be as narrow as possible. Thus, a coupling capacitance value between the wirings becomes large. Thus, in the driver IC in which the time divisional switch is used to perform the time division drive on the amorphous TFT, the coupling capacitance value between the wirings influences a signal on the adjacent data line to indicate an undesirable signal value and brings about a display unevenness. The generating mechanism of the display unevenness caused by the data line drive according to the conventional technique will be described below with reference to FIG. 1 and FIGS. 2A to 2I.

FIG. 1 is a circuit diagram showing the configuration of time divisional switches mounted on the data line driving circuit according to a conventional example. FIGS. 2A to 2I are timing charts showing a data line driving operation that is performed in the circuit diagram shown in FIG. 1.

With reference to FIG. 1, the data line driving circuit according to the conventional technique includes buffers 71-1 to 71-4 for driving a plurality of data lines, and time divisional switches 81, 82 and 83 provided between output terminals 72-1 to 72-4 of the buffers 71-1 to 71-4 and each of the plurality of data lines. In detail, the data line driving circuit according to the conventional technique includes the buffer 71-1 for driving data lines R1, G1 and B1 and the time divisional switches 81, 82 and 83 provided between the output terminal 72-1 of the buffer 71-1 and each of the data lines R1, G1 and B1. The time divisional switches 81, 82 and 83 are turned on or off in response to control signals 91, 92 and 93, and control the electric connection or disconnection between the output terminal 72-1 and the data lines R1, G1 and B1, respectively. Similarly, the other buffers 71-2 to 71-4 are electrically connected to or disconnected from R2 to R4, G2 to G4 and B2 to B4 through the time divisional switches 81, 82 and 83, respectively.

With reference to FIGS. 2A to 2I, before a time T1, a scanning signal is supplied to a scanning line Yn, and TFTs connected to the scanning line Yn are turned on. At the time T1, when the time divisional switch 81 is turned on, the buffers 71-1, 71-2, 71-3 and 71-4 drive the data lines R1, R2, R3 and R4, respectively. Subsequently, at a time T2, the time divisional switch 81 is turned off. Thus, the data lines R1, R2, R3 and R4, since they being electrically disconnected from the buffers 71-1, 71-2, 71-3 and 71-4, become in high impedance states and hold display signals corresponding to a display data. Also, at the time T2, the time divisional switch 82 is turned on, and the buffers 71-1, 71-2, 71-3 and 71-4 drive data lines G1, G2, G3 and G4, respectively. At this time, the data lines R1, R2, R3 and R4, which are adjacent to the data lines G1, G2, G3 and G4, respectively, are in the high impedance states. Therefore, when the data lines G1, G2, G3 and G4 are driven, the display signals (the voltage values) held in the data lines R1, R2, R3 and R4 are varied by the coupling capacitances.

Next, at a time T3, the time divisional switch 82 is turned off. Thus, the data lines G1, G2, G3 and G4, since they are electrically disconnected from the buffers 71-1, 71-2, 71-3 and 71-4, become in the high impedance states and hold the display signals corresponding to the display data. Also, at the time T3, when the time divisional switch 83 is turned on, the buffers 71-1, 71-2, 71-3 and 71-4 drive data lines B1, B2, B3 and B4. At this time, the data lines G1, G2, G3 and G4, which are adjacent to the data lines B1, B2, B3 and B4, respectively, and the data lines R2, R3 and R4 are in the high impedance states. Therefore, when the data lines B1, B2, B3 and B4 are driven, the display signals (the voltage values) held in the data lines G1, G2, G3 and G4 and the data lines R2, R3 and R4 are varied due to the coupling capacitances.

Next, at a time T4, the time divisional switch 83 is turned off. Thus, the data lines B1, B2, B3 and B4, since they are electrically disconnected from the buffers 71-1, 71-2, 71-3 and 71-4, become in the high impedance states and hold the display signals corresponding to the display data. After the time T4, the TFTs connected to the scanning line are turned off, and the signal (the voltage value) on each data line at the time T4 is written to each pixel.

As mentioned above, the voltages held in the data lines R1, G1, G2, G3 and G4 are varied by ΔV1 by driving the data lines adjacent to any one of the right and left side only one time, and the voltages held in the data lines R2, R3 and R4 are varied by ΔV1+ΔV2 by driving the data lines adjacent to the right and left sides two times. Here, when a coupling capacitance value between the data lines is assumed to be Cc, a parasitic capacitance value of each data line is assumed to be Cd, and a voltage written to the adjacent data line at a next time is assumed to be ΔVsig, a voltage variation amount ΔV caused by the coupling capacitance value resulting from the adjacent data line is the capacitance voltage variation amount $\Delta V = \Delta Vsig \cdot Cc/(Cd+Cc)$.

In this way, the voltage variation amount ΔV (ΔV1, ΔV2) is also varied on the basis of the display signals sent to the adjacent data lines. Theoretically, the voltage variation amount ΔV can be reduced by decreasing a coupling capacitance value Cc, increasing a parasitic capacitance Cd or decreasing ΔVsig. However, the increase in the parasitic capacitance Cd is not preferred because not only the electric power consumption is increased, but also the lack of the write current to the pixel is caused. Also, the reduction of the coupling capacitance Cc can be attained by widening an interval between the wirings. However, the wiring region is made larger, and the panel size is made greater.

According to the second conventional example, time divisional switches are controlled based on sampling pulses which are generated by a shift register and sequentially shifted. According to this circuit configuration, one buffer drives the several tens or more data lines. Thus, since the wiring length of the display signal line becomes long, the parasitic capacitance is made larger, which increases the electric power consumption. Also, in the data line away from the buffer, the waveform is made dull, which brings about the lack of the write current, and the contrast is reduced. Moreover, the continuous data lines are controlled by the sampling signal generated by the shift register. Thus, in case where gamma compensation is independently performed for each of R, G and B, a gray scale voltage generating circuit is required to be provided inside the driver IC. Thus, the chip area is made larger.

SUMMARY

In one embodiment of the present invention, a data line driving circuit includes a first buffer circuit configured to drive a data line, and a second buffer circuit configured to drive a data line. N first data lines (n is a natural number larger than 1), and m second data lines (m is a natural number larger than 1) are alternately arranged in units of data lines as a group. The data line driving circuit further includes a first switch circuit configured to select one of the n first data lines in a first ON period and to connect the selected first data line with the first buffer circuit, and a second switch circuit configured to select one of the m second data lines adjacent to the selected first data line in a second ON period and to connect the selected second data line with the second buffer circuit.

In another embodiment of the present invention, a data line driving method is achieved by connecting a selected one of n first data lines (n is a natural number larger than 1) and a first buffer circuit by one of first switches; by connecting a selected one of m second data lines adjacent to the selected first data line and a second buffer circuit by one of second switches, wherein the n first data lines and the m second data lines are alternately arranged as a group in units of data line; by driving the selected first data line by the first buffer circuit; and by driving the selected second data line by the second buffer circuit.

In still another embodiment of the present invention, a display apparatus includes a display panel comprising n first data lines (n is a natural number larger than 1), and m second data lines (m is a natural number larger than 1) alternately arranged in units of data lines as a group in a display region, and a data line driving circuit configured to drive the group of the n first data lines and the m second data lines. The data line driving circuit includes a first buffer circuit configured to drive a data line, and a second buffer circuit configured to drive a data line, a first switch circuit configured to select one of the n first data lines in a first ON period and to connect the selected first data line with the first buffer circuit, and a second switch circuit configured to select one of the m second data lines adjacent to the selected first data line in a second ON period and to connect the selected second data line with the second buffer circuit.

As mentioned above, according to the present invention, the display unevenness of the display apparatus can be improved.

Also, the chip area of the driver IC for driving the data line of the display apparatus can be reduced.

BRIEF DESCRIPTION OF THE DRAWINGS

The above and other objects, advantages and features of the present invention will be more apparent from the following description of certain preferred embodiments taken in conjunction with the accompanying drawings, in which.

DESCRIPTION OF THE PREFERRED EMBODIMENTS

Figure 1:
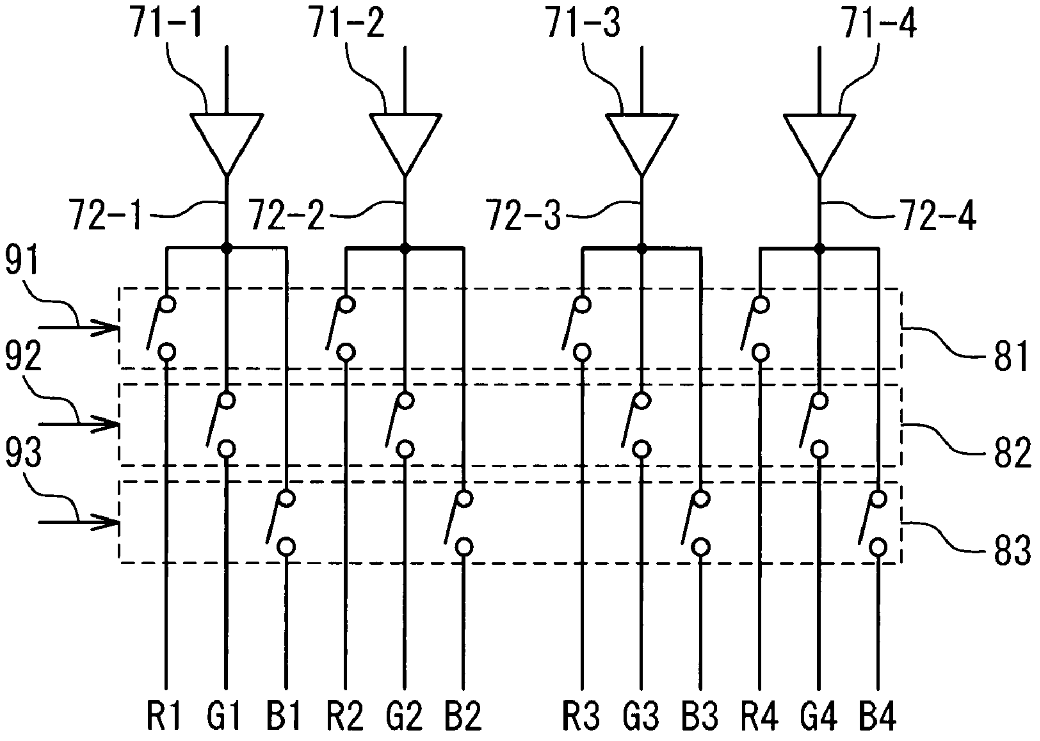
Fig. 1 PRIOR ART
FIG. 1 is a circuit diagram showing a configuration of time divisional switches in a data line driving circuit according to a conventional technique.
Figure 2:
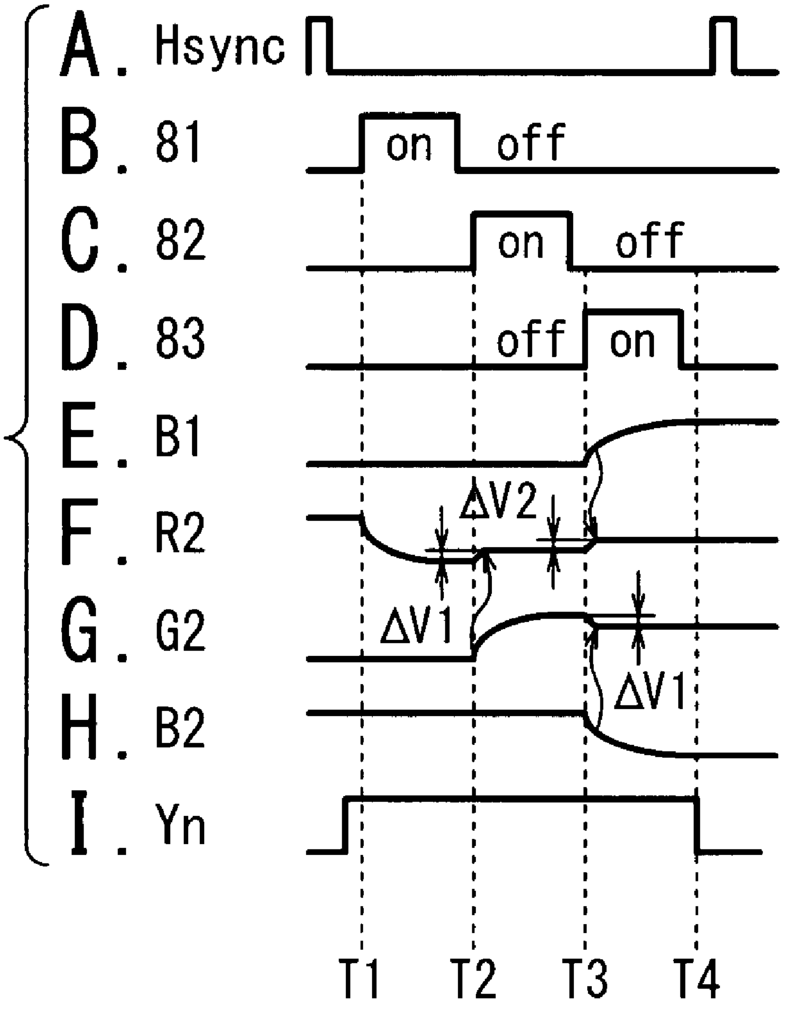
Fig. 2 PRIOR ART
FIGS. 2A to 2I are timing charts showing an operation of the time divisional switch in the conventional technique.

Hereinafter, a display apparatus with a driving circuit according to the present invention will be described in detail with reference to the attached drawings. In the drawings and the following description, the same or similar reference numerals and symbols indicate the same, similar or equivalent components.

(Configuration of Display Apparatus)

Figure 3:
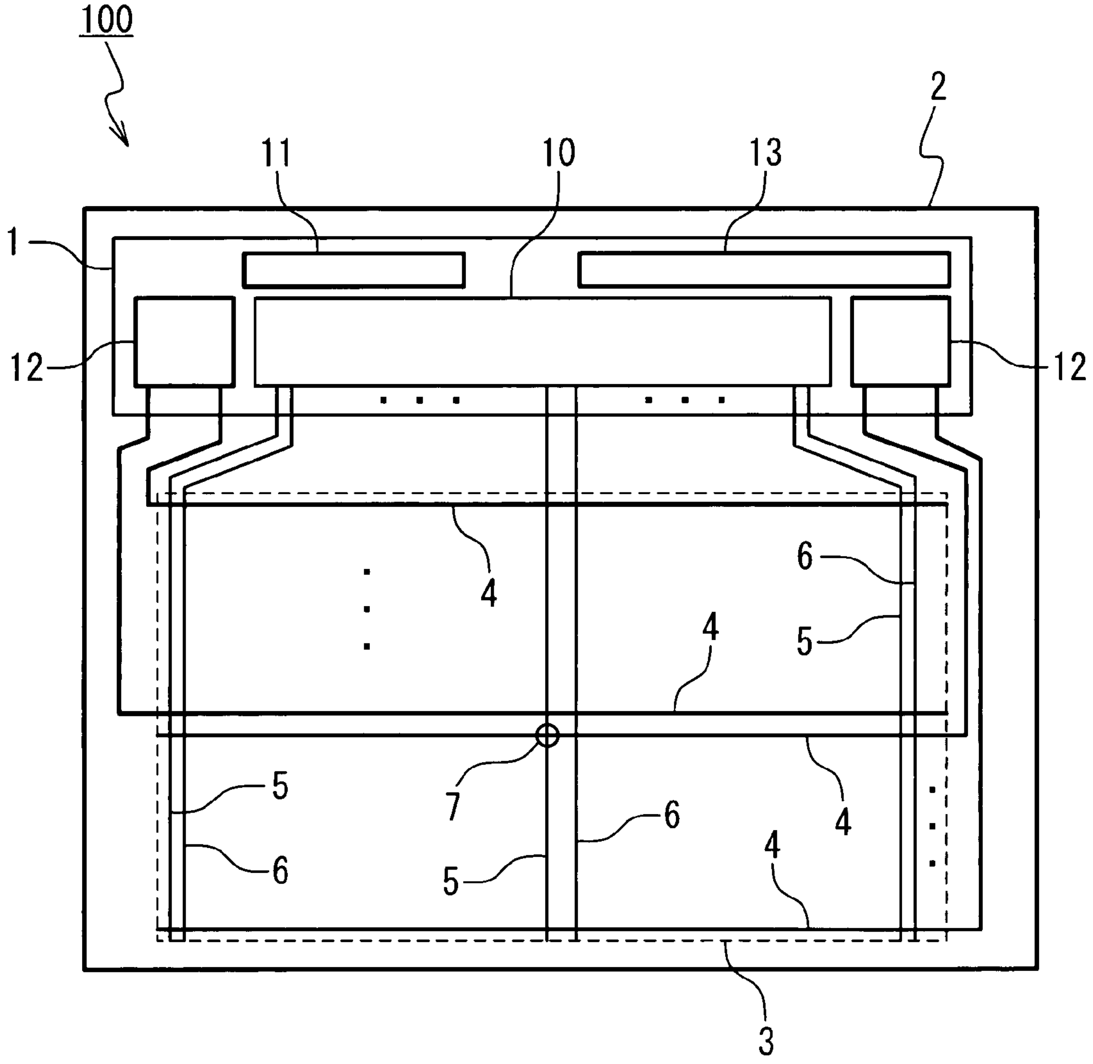
FIG. 3 is a block diagram showing a configuration of a display apparatus according to the present invention.

FIG. 3 is a block diagram showing a configuration of a display apparatus 100 according to the present invention. With reference to FIG. 3, the display apparatus 100 includes a display region 3 provided on a panel substrate 2, a data line driving circuit 10, a signal processing circuit 11, a scanning line driving circuit 12 and a power source circuit 13. Here, in the display apparatus used in a portable apparatus such as a mobile phone, the data line driving circuit 10, the signal processing circuit 11, the scanning line driving circuit 12 and the power source circuit 13 are preferably integrated on a semiconductor substrate made of silicon in a driver IC1 and mounted on the panel substrate 2. On the display region 3, a plurality of data lines 5 and 6 and a plurality of scanning lines 4 orthogonal to the data lines 5 and 6 are formed, and a pixel 7 exemplified by a liquid crystal and an organic EL is formed at each of their intersections and includes a TFT (Thin Film Transistor) as a switching element. A display electrode and a common electrode, which apply an electric field to the pixel 7 of liquid crystal or organic EL, are formed. A display signal is sent from the data line driving circuit 10 to the display electrode to control the brightness of a pixel (a transmission quantity of light and a light emission quantity).

The signal processing circuit 11 generates control signals based on signals such as an input clock signal, a display data, a horizontal synchronization signal Hsync, a vertical synchronization signal Vsync, and controls the data line driving circuit 10, the scanning line driving circuit 12 and the power source circuit 13.

The scanning line driving circuit 12 is a circuit for sequentially driving the scanning lines 4 under the control of the signal processing circuit 11. In detail, the scanning line driving circuit 12 sequentially drives the scanning lines 4 within a vertical period determined by the vertical synchronization signal Vsync such that the display signal sent to the data lines 5 and 6 are written into the pixel 7.

The power source circuit 13 generates voltages in accordance with a DC power supply voltage VDC supplied externally and supplies to the data line driving circuit 10 and the scanning line driving circuit 12. The power source circuit 13 includes a DC/DC converter, a regulator and the like, and generates the power supply voltage of the data line driving circuit 10, the power supply voltage of the scanning line driving circuit 12, the voltage of the common electrode of the liquid crystal, and the like.

First Embodiment

The display apparatus with the data line driving circuit according to the first embodiment of the present invention will be described below with reference to FIGS. 3 to 7. The display apparatus 100 in the first embodiment includes a data line driving circuit 10A as the data line driving circuit 10 in FIG. 3.

Figure 4:
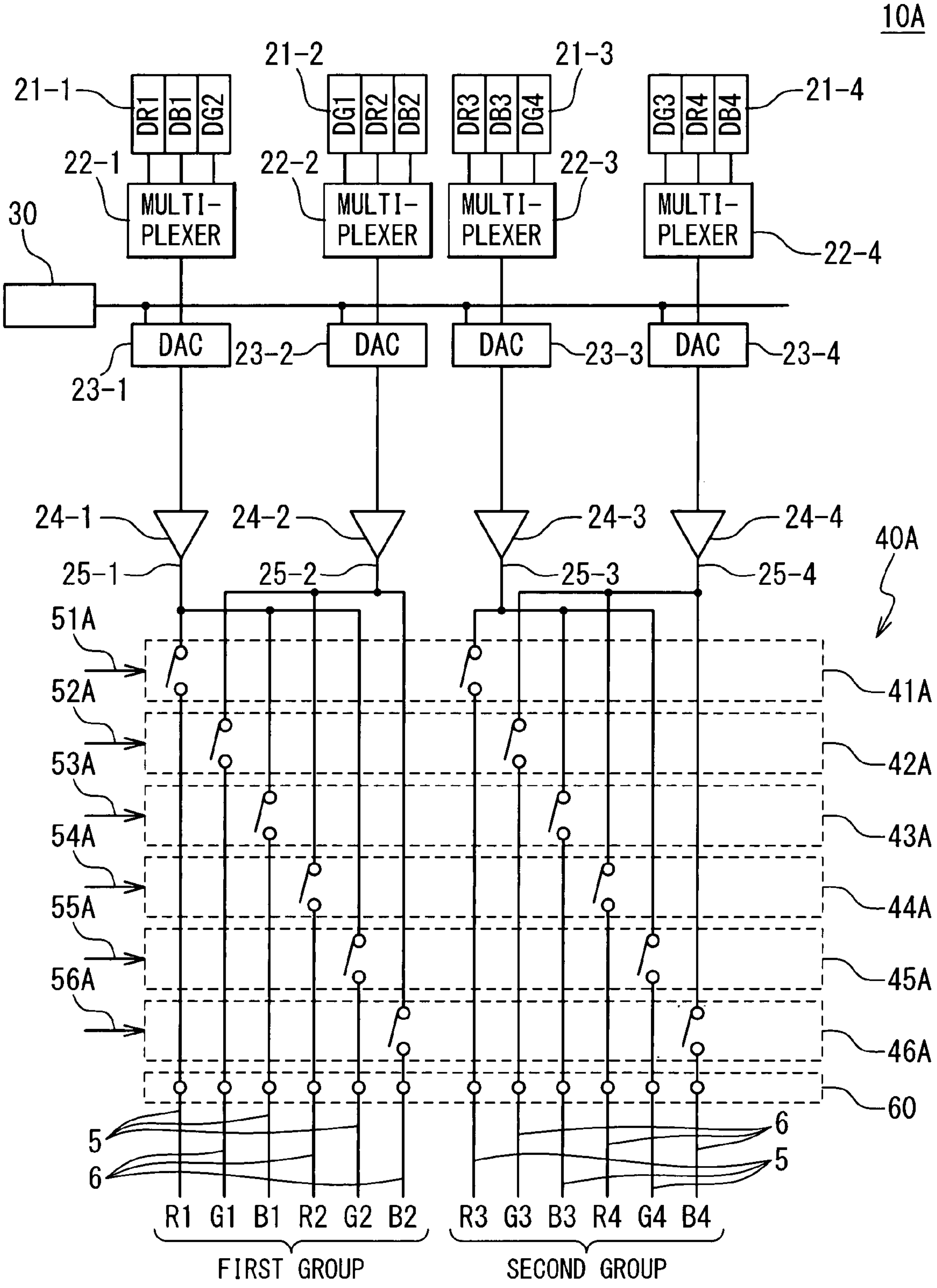
FIG. 4 is a circuit diagram showing a configuration of a data line driving circuit of a display apparatus according to a first embodiment of the present invention.
Figure 5:
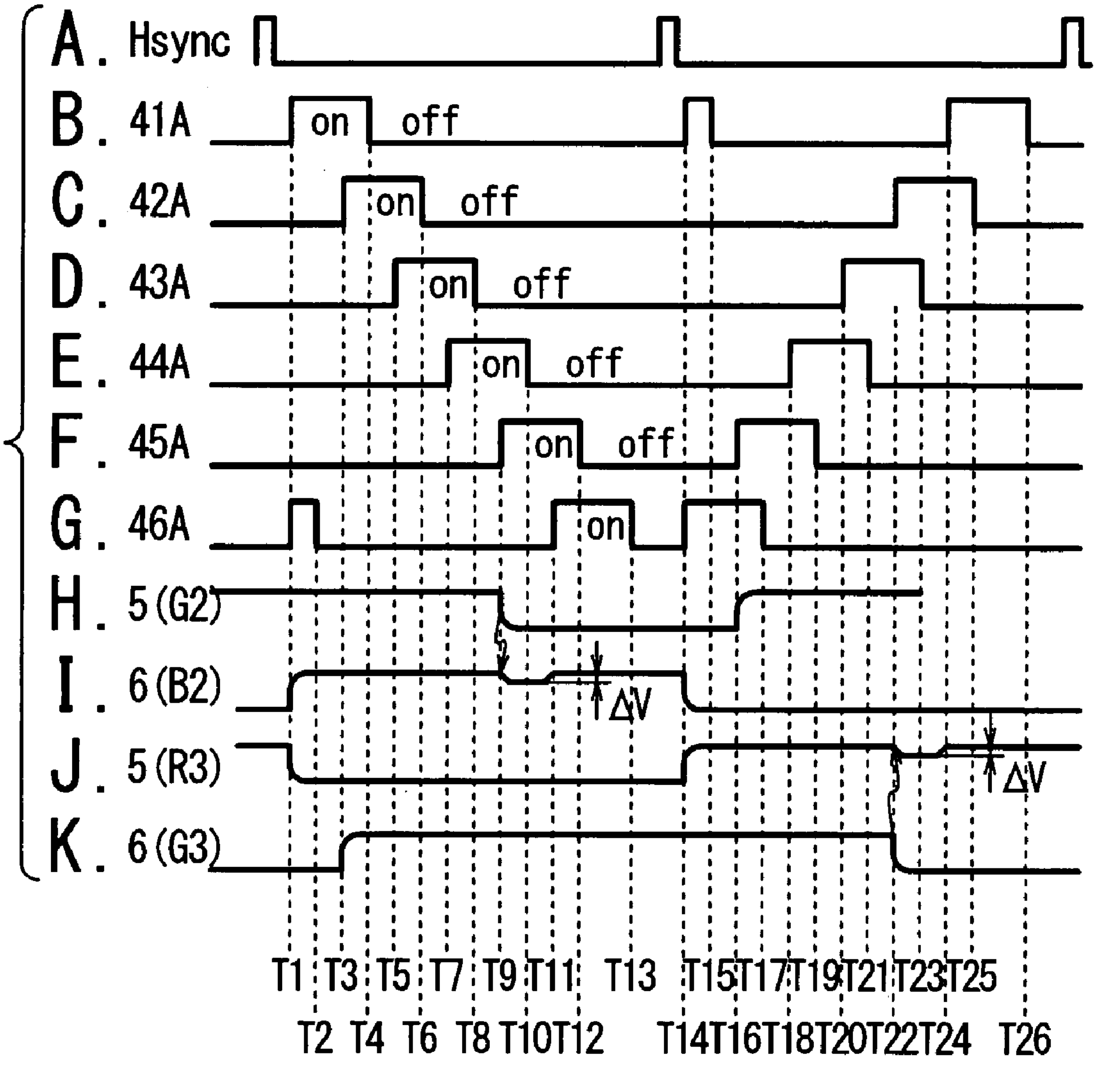
FIGS. 5A to 5K are timing charts showing an operation of the data line driving circuit in the first embodiment.

FIG. 4 is a circuit diagram showing a configuration of the data line driving circuit 10A in the first embodiment. With reference to FIG. 4, the configuration of the data line driving circuit 10A in the first embodiment will be described in detail. The data line driving circuit 10A is a circuit for sending display signals through the plurality of data lines 5 and 6 to the pixels 7, and contains at least data latches 21 (21-1 to 21-4), multiplexers 22 (22-1 to 22-4), D/A converters (DAC: Digital Analog Converter) 23 (23-1 to 23-4), buffers 24 (24-1 to 24-4), a gray scale voltage generating circuit 30 and a time divisional switch group 40A. Moreover, although not shown, shift registers, data registers, a frame memory may be built therein. The multiplexer 22 and the time divisional switch group 40A are controlled by the control signals from the signal processing circuit 11.

The data latch 21 latches display data DR, DG and DB in synchronization with a strobe signal ST (not shown). The multiplexer 22 selects any of the display data DR, DG and DB latched in the data latch 21 in response to the control signal from the signal processing circuit 11, and outputs the selected display data to the DAC 23. The gray scale voltage generating circuit 30 supplies gray scale voltages V to the DAC 23 based on a gamma conversion property corresponding to the property of the pixel 7. The DAC 23 selects one of the gray scale voltages V on the basis of the display data selected by the multiplexer 22 and outputs the selected voltage as display signals R, G and B to the buffer 24. The buffer 24 amplifies the display signals R, G and B outputted by the DAC 23 and outputs the amplified signals to the data lines 5 and 6 connected to the buffer 24 itself. The output terminals 25 of the buffers 24 are connected through the time divisional switch group 40A to the data lines 5 and 6. The time divisional switch group 40A contains time divisional switches 41A to 46A and controls the electrical connection or disconnection between the buffer 24 and the data lines 5 and 6.

Here, the data line 5 and the data line 6 are the plurality of data lines that are alternately arranged. In order to clarify the description, the display apparatus 100 according to the first embodiment is assumed to have a total of 12 data lines composed of six data lines 5 and six data lines 6. It should be noted that the numbers of the data lines 5 and 6 provided in the display apparatus 100 are not limited thereto. Naturally, 12 or more data lines are usually provided. Output terminals 60 of the data line driving circuit 10A are connected to the data lines 5 and 6, and the driver IC1 outputs the display signals R, G and B through the output terminals 60 to the data lines 5 and 6. It should be noted that [R, G, B] correspond to [Red, Green, Blue], respectively. Hereinafter, the data lines 5 and 6 to which the display signals R, G and B are supplied are referred to as a data line 5 (R, G, B), a data line 6 (R, G, B), respectively. For example, the data line to which a display signal Rn is supplied is referred to as a data line 5 (Rn).

When the arranging order of the data lines 5 and 6 provided in the display apparatus 100 in the first embodiment is represented by using the symbols of the display signals supplied to the data lines, they are arranged in the order of (R1, G1, B1, R2, G2, B2, R3, G3, B3, R4, G4 and B4) continuously in the row direction. Since the data line 5 and the data line 6 are alternately arranged, the display signals R1, B1, G2, R3, B3 and G4 are supplied to the data lines 5, and the display signals G1, R2, B2, G3, R4 and B4 are supplied to the data lines 6.

The first embodiment will be described by using an example in which one buffer is used to drive the three data lines in a time divisional manner. With reference to FIG. 4, the data line driving circuit 10A includes the buffers 24-1 and 24-3 that each of the output terminals 25-1 and 25-3 is connected to the three data lines 5; and the buffers 24-2 and 24-4 that each of the output terminals 25-2 and 25-4 is connected to the three data lines. In detail, the buffer 24-1 is connected through time divisional switches 41A, 43A and 45A, which will be described later, to the data lines 5 (R1, B1 and G2), and the buffer 24-3 is similarly connected through the time divisional switches 41A, 43A and 45A to the data lines 5 (R3, B3 and G4). Also, the buffer 24-2 is connected through time divisional switches 42A, 44A and 46A, which will be described later, to the data lines 6 (G1, R2 and B2), and the buffer 24-4 is similarly connected through the time divisional switches 42A, 44A and 46A to the data lines 6 (G3, R3 and B4). Here, the data line driving circuit 10A includes the data latches 21-1 to 21-4, the multiplexers 22-1 to 22-4 and the DACs 23-1 to 23-4 which are connected to one after another in corresponding to the buffers 24-1 to 24-4, respectively. It should be noted that this embodiment will be described under the assumption that the number of the buffers 24 is 4 on the basis of that the number of the data lines 5 and 6 is 12. However, the number thereof is naturally increased or decreased on the basis of the number of the data lines 5 and 6. Also, when the number of the data lines 5 and 6 connected to one buffer 24 is a multiple of 3, it may not be limited to 3.

The time divisional switch group 40A will be described below in detail. The time divisional switches 41A, 43A and 45A serving as first switches are provided between the buffer 24-1 and the data lines 5 (R1, B1 and G2). Also, the time divisional switches 42A, 44A and 46A serving as second switches are provided between the buffer 24-2 and the data lines 6 (G1, R2 and B2). Similarly, the time divisional switches 41A, 43A and 45A serving as the first switches are provided between the buffer 24-3 and the data lines 5 (R3, B3 and G4). Also, the time divisional switches 42A, 44A and 46A serving as the second switches are provided between the buffer 24-4 and the data lines 6 (G3, R4 and B4). The time divisional switches 41A to 46A are controlled in response to the control signals 51A to 56A respectively generated by the signal processing circuit 11. Here, the data lines to which the display signals R1, G1, B1, R2, G2 and B2 are supplied are defined as a first group, and the data lines to which the display signals R3, G3, B3, R4, G4 and B4 are supplied are defined as a second group. In case of the time divisional driving system according to the conventional technique, the time divisional switches are controlled based on the n control signals. However, in this embodiment, one data line group is driven by the two buffers 24, and each of the buffers 24 drives the n data lines in the time divisional manner, and the time divisional switches connected to the one group are controlled based on the (n+n) control signals. For example, the time divisional switches 41A to 46A connected to the data lines of the first group (or second group) are controlled by the 6 control signals 51A to 56A.

Figure 6:
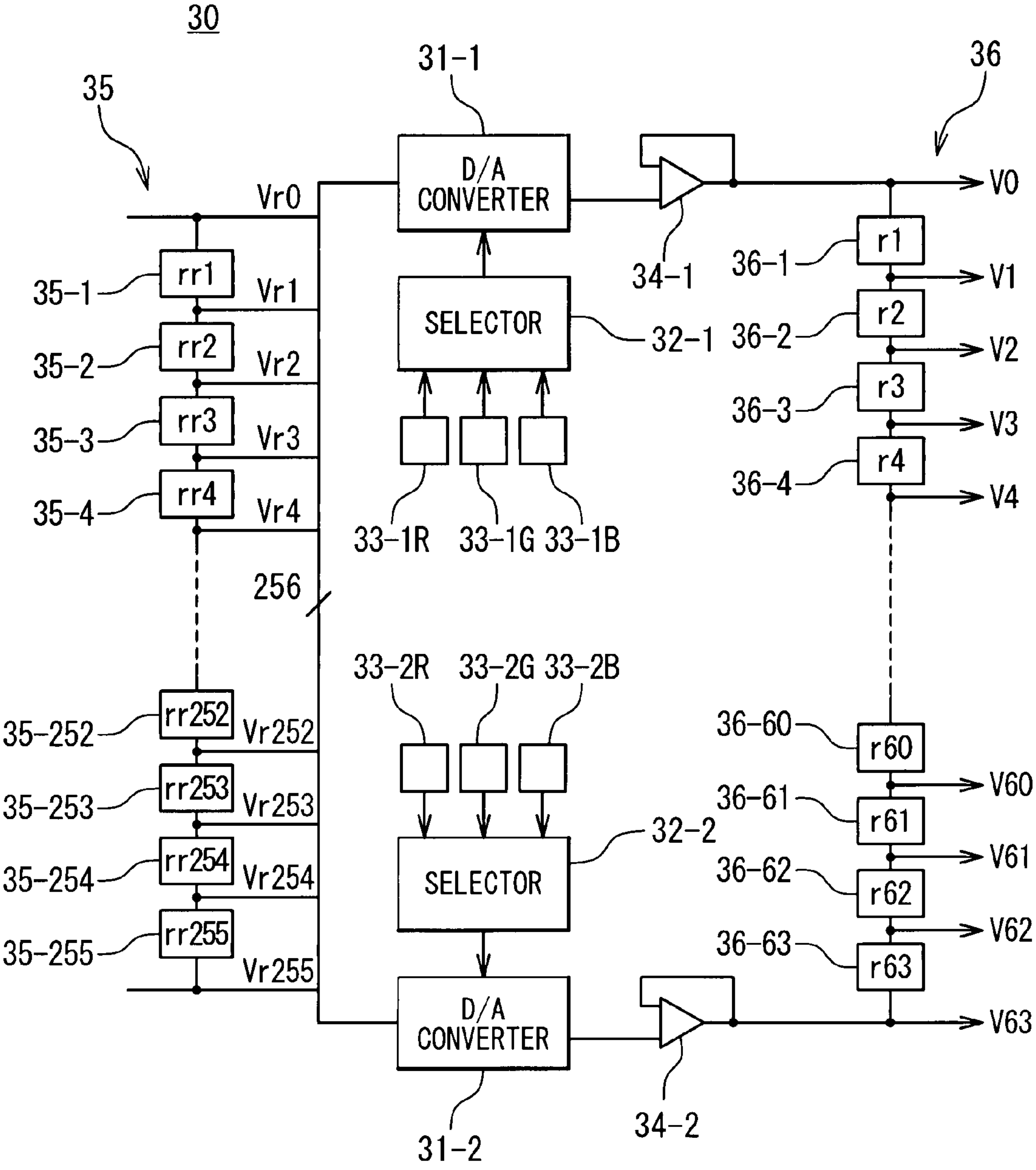
FIG. 6 is a block diagram showing the configuration of a gray scale voltage generating circuit in the data line driving circuit in the first embodiment.

The gray scale voltage generating circuit 30 generates the gray scale voltages V (V0 to V63) serving as the reference voltages of the display signals R, G and B to indicate the gray scale of the pixel 7. Here, the gray scale voltage V will be described as 64 signal levels. The gray scale voltage generating circuit 30 supplies the gray scale voltages V to the DAC 23 in accordance with a reference supply voltage supplied from the power source circuit 13. FIG. 6 is a block diagram showing the configuration of the gray scale voltage generating circuit 30 according to the present invention. With reference to FIG. 6, the gray scale voltage generating circuit 30 includes D/A converters 31 (31-1, 31-2), selectors 32 (32-1, 32-2), registers 33 (33-1R, 33-1G, 33-1B, 33-2R, 33-2G and 33-2B), buffers 34 (34-1, 34-2), a resister string circuit 35 and a resistor string circuit 36. The register 33 is provided for each of R, G and B and stores a data to set the maximum brightness and the minimum brightness. The selector 32 selects any of RGB data from the registers 33 in association with the time divisional switch group 40 and supplies the selected data to the D/A converter 31. The resister string circuit 35 resistively divides the reference supply voltage supplied from the power source circuit 13 with resistors rr1 to rr255 and supplies as reference voltages Vr (Vr0 to Vr255) to the D/A converter 31. The D/A converter 31 selects one from the reference voltages Vr0 to Vr255 in accordance with the data selected by the selector 32 and supplies the selected voltage to the buffer 34. The buffer 34 amplifies the voltage from the D/A converter 31 and outputs to the resistor string circuit 36. The resistor string circuit 36 contains resistors r1 to r63 set to the resistance values to meet the gamma property and resistor-divides the signal amplified by the buffer 34 and then outputs as the gray scale voltages V0 to V63 to the DAC 23.

In the data line driving circuit 10A according to the present invention, the number of the data lines driven by one buffer 24 is a multiple of 3, and the data to set the brightness of the gray scale voltage generating circuit 30 can be switched by the selector 32. Thus, the gamma compensation can be attained independently for each RGB. For this reason, in the first embodiment, since the data line for each same color (RGB) is driven in the time division, even one resister string circuit can attain the gamma compensation independently for each RGB.

Next, the operation of the data line driving circuit 10A according to the first embodiment of the present invention will be described below with reference to FIGS. 5A to 5K. FIGS. 5A to 5K are timing charts showing the operation of the time divisional switch group 40A in the two horizontal periods of the first and second scanning lines; and the signal levels of the data lines 5 (G2), 6(B2), 5(R3) and 6(G3) to which the display signals G2, B2, R3 and G3 are supplied. It should be noted that the data lines 5(G2), 6(B2), 5(R3) and 6(G3) are continuously arranged, as shown in FIG. 4.

The display data DR, DG and DB held in the data register or frame memory are latched in the data latch 21 in the horizontal period corresponding to the horizontal synchronization signal Hsync.

At first, at a time T1, the multiplexers 22-1, 22-2, 22-3 and 22-4 select display data DR1, DB2, DR3, and DB4, respectively. Also, the control signals 51A and 56A turn on the time divisional switches 41A and 46A. At this time, the buffers 24-1, 24-2, 24-3 and 24-4 use the display signals R1, B2, R3 and B4 corresponding to the display data DR1, DB2, DR3, and DB4, respectively, and drive the data lines 5 (R1), 6 (B2), 5 (R3) and 6 (B4), respectively. Hereinafter, in order to simplify the description, the description of [the buffers 24-1, 24-2 and 24-3 use the display signals R1, Gn and Bm corresponding to the display data DR1, DGn and DBm, respectively, and drive the data lines 5 (R1), 5 (Gn) and 5 (Bm), respectively] is made as [the buffers 24-1, 24-2 and 24-3 drive the data lines 5 (R1), 5 (Gn) and 5 (Bm)]. In this way, at the time T1, the data lines 5 (R1), 6 (B2), 5 (R3) and 6 (B4) at both ends of the first and second groups are driven. That is, the data line 6 (B2) and the data line 5 (R3) adjacent in the first and second groups are driven.

Next, at a time T2, the time divisional switch 46A is turned off. Thus, the data lines 6 (B2) and 6 (B4) are disconnected from the buffers 24-2 and 24-4 and become in the high impedance states. The pixels 7 connected to the data lines 6 (B2) and 6 (B4) are driven by TFTs. However, since the TFT is high in on resistance, the pixel 7 is not required to arrive at the target voltage, and a period between the times T1 and T2 may be a period until the data line arrives at the target voltage.

Next, at a time T3, the multiplexers 22-2 and 22-4 select the display data DG1 and DG3, respectively. Also, while the time divisional switch 41A is turned on, the time divisional switch 42A is turned on in response to the control signal 52A, and the buffers 24-2 and 24-4 drive the data lines 6 (G1) and 6 (G3). At this time, the data lines 5 (R1) and 5 (R3) adjacent to the data lines 6 (G1) and 6 (G3) are connected to the buffers 24-1 and 24-3, respectively. Then, since they are low in impedance, a voltage change caused by a coupling capacitance is never involved. A period between the times T2 and T3 is a period to prevent interference between the time divisional switches connected to the same buffer. Then, after the time divisional switch 46A is turned off, the time divisional switch 42A is turned on.

Next, at a time T4, the time divisional switch 41A is turned off in response to the control signal 51A. Thus, the data lines 5 (R1) and 5 (R3) are disconnected from the buffers 24-1 and 24-3, and hold the display signals corresponding to the display data. In a period between the times T3 and T4, since the data lines 6 (G1) and 6 (G3) arrive at the target voltages, the data lines 5 (R1) and 5 (R3) do not receive any influences of the coupling capacitances from the adjacent data lines 6 (G1) and 6 (G3). Thus, they are disconnected from the buffers 24-1 and 24-3. In the conventional technique, when the data line is in the high impedance state, this receives any influence of the coupling capacitance of the adjacent data line. However, in the present invention, the time divisional switch group 40A is controlled such that the adjacent data line becomes in the high impedance state, after arriving at the target voltage. Therefore, the influence of the coupling capacitance on the adjacent data line can be avoided. Hereinafter, in a period between the times T5 and T8, the operation similar to a period between the times T3 and T4 are repeated. Thus, the description is omitted.

Next, at a time T9, the multiplexers 22-1 and 22-3 select the display data DG2 and DG4. Also, while the time divisional switch 44A is turned on, the control signal 55A turns on the time divisional switch 45A. The buffers 24-1 and 24-3 use the display signals corresponding to the display data and drive the data lines 5 (G2) and 5 (G4). At this time, the data lines 6 (R2) and 6 (R4) adjacent to the data lines 5 (G2) and 5 (G4) are connected to the buffers 24-2 and 24-4. Then, since they are low in impedance, the voltage variation caused by the coupling capacitance is never involved. However, since the data lines 6 (B2) and 6 (B4) adjacent to the data lines 5 (G2) and 5 (G4) are in the high impedance states, the voltage values of the data lines 6 (B2) and 6 (B4) are varied by ΔVc. Irrespectively of a secondary factor, the data line 5 (R3) adjacent to the data line 6 (B2) is also in the high impedance state, the voltage value of the data line 5 (R3) is varied by ΔVc' because of the influence caused by the voltage variation of ΔVc.

Here, when the coupling capacitance between the data lines is assumed to be Cc, a parasitic capacitance of each data line is assumed to be Cd, and a voltage width to be written to the adjacent data line at a next time is assumed to be ΔVsig, a variation amount is represented by $\Delta Vc=\Delta Vsig\times Cc/(Cd+Cc)$. In order to simplify the description, Cc:Cd=1:99 is assumed. In this case, if Δvsig=5V, the variation amount is represented by ΔVc=50 mV. Also, when the variation amount ΔVc' is assumed to be Vsig=5V, ΔVc=50 mV which is 1/100 thereof. Therefore, this becomes the extremely small value such as ΔVc'=0.5 mV.

Next, at a time T10, the time divisional switch 44A is turned off in response to the control signal 54A. Thus, the data lines 6 (R2) and 6 (R4) are disconnected from the buffers 24-2 and 24-4, and hold the display signals corresponding to the display data. In a period between the times T9 and T10, since the data lines 5 (G2) and 5 (G4) arrive at the target voltages, the data lines 6 (R2) and 6 (R4) do not receive any influences of the coupling capacitances from the data lines 5 (G2) and 5 (G4). Thus, they are disconnected from the buffers 24-2 and 24-4.

Next, at a time T11, the multiplexers 22-2 and 22-4 select the display data DB2 and DB4. Also, while the time divisional switch 45A is turned on, the control signal 56A turns on the time divisional switch 46A. The buffers 24-2 and 24-4 use the display signals corresponding to the display data and again drive the data lines 6 (B2) and 6 (B4). The data lines 6 (B2) and 6 (B4) arrive at the target voltage in a period between the times T1 and T2. However, the coupling capacitance of the adjacent data lines 5 (G2) and 5 (G4) at the time T9 cause the voltage to be varied by ΔVc. However, with the re-driving at the time T11, the voltage variation is compensated, and ΔVc is canceled. At this time, the data line 5 (R3) adjacent to the data line 6 (B2) is varied by ΔVc' at the time T9, as mentioned above. However, at the time T11, the coupling capacitance when the adjacent data line 6 (B2) is driven causes the voltage value of the data line 5 (R3) to be varied by −ΔVc'. Thus, the voltage variation ΔVc' at the time T9 is canceled.

Next, at a time T12, the control signal 55A turns off the time divisional switch 45A. Thus, the data lines 5 (G2) and 5 (G4) are disconnected from the buffers 24-1 and 24-3 and hold the display signals corresponding to the display data.

Next, at a time T13, the control signal 56A turns off the time divisional switch 46A. Thus, the data lines 6 (B2) and 6 (B4) are disconnected from the buffers 24-2 and 24-4 and hold the display signals corresponding to the display data.

As mentioned above, the operation between the times T1 and T13 is performed in one horizontal period.

Next, the scanning line 4 will be described. Before and after the time T1, the scanning line driving circuit 12 makes the first scanning line 4 active, to turn on the TFTs of the pixels 7 connected to the first scanning line 4. Then, the display signals R, G and B sent to the data lines 5 and 6 are written to the pixels 7. Then, after the time T13, the first scanning line 4 is made inactive, to turn off the TFTs. Then, the display signals R, B and G sent to the data lines 5 and 6 are held in the pixels 7. A period until the first scanning line 4 is made inactive after the time T13 reserves a period until the pixel 7 arrives at the target voltage. In this embodiment, ON periods during which the first and second switches respectively connected to the data lines 5 and 6 alternately arranged are turned on are controlled to overlap each other by a predetermined period. Also, the first switches or second switches connected to one buffer are controlled such that their ON periods do not overlap each other. Moreover, the data line to be finally driven is driven at a same timing as or a timing earlier than the firstly driven data line and then again driven. In this way, since the driving of the data line is controlled, the voltage variation caused by the coupling capacitance of the adjacent data line is suppressed. Thus, according to the data line driving circuit 10A of the present invention, the generation of the display unevenness on the display apparatus 100 can be suppressed.

On the other hand, the gamma compensation for each of R, G and B in the gray scale voltage generating circuit 30 is switched from B to R at the time T1 or T2, from R to G at the time T4, from G to B at the time T6, from B to R at the time T8, from R to G at the time T10, and from G to B at the time T12. The voltage difference for each of R, G and B is about several tens of mV, and the data line in the period between the times T4 and T6 is driven to the switched voltage value. In this embodiment, the data line for each same color is driven in the time division. Thus, in even one resister string circuit, the gamma compensation for each of R, G and B can be independently performed.

Figure 7:
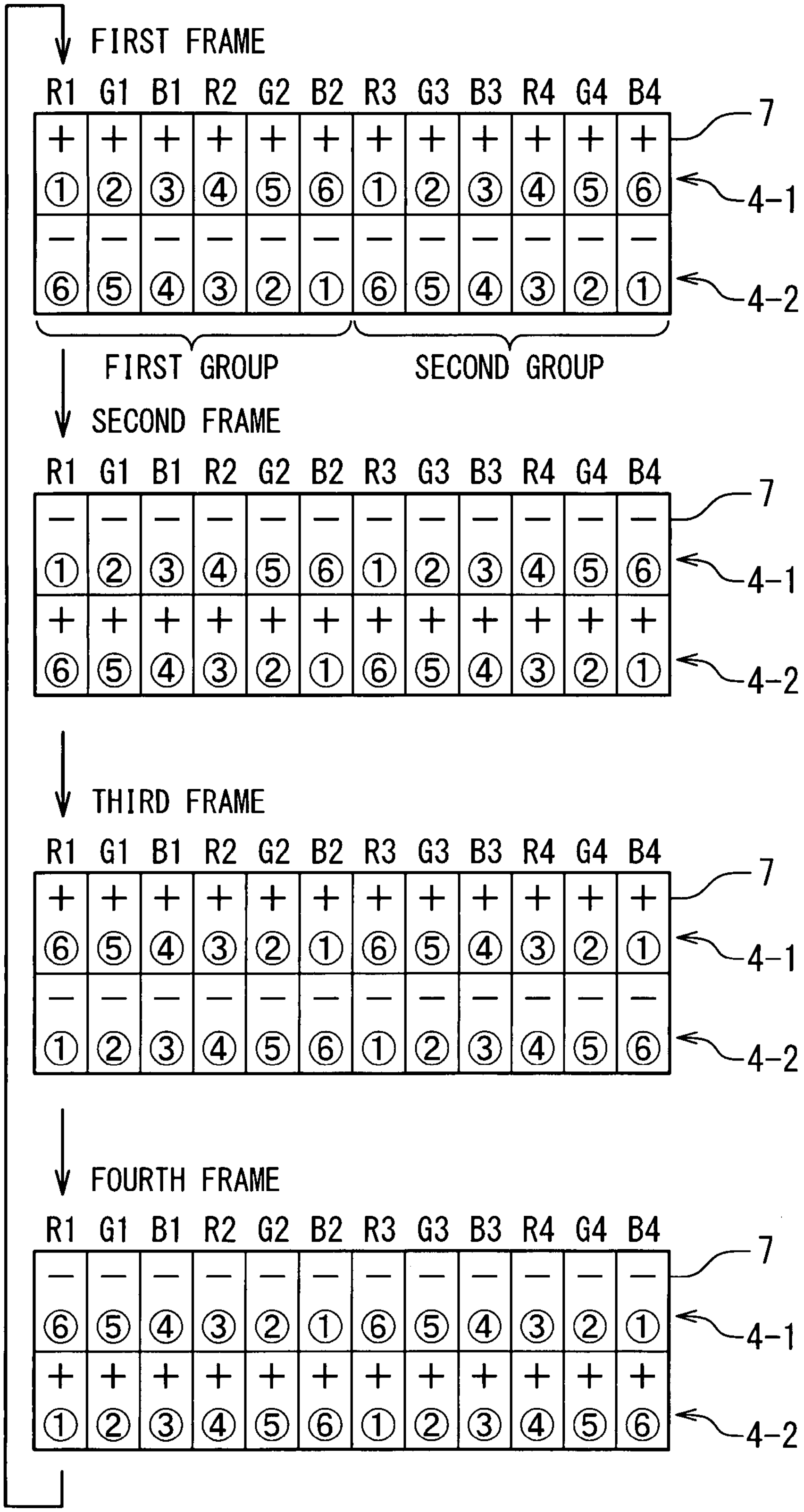
FIG. 7 is a conceptual view showing a write order of pixels of the data line driving circuit in the first embodiment.

The display unevenness results from not only the voltage variation caused by the coupling capacitance of the adjacent data line, but also a leak of the TFT and a leak in the time divisional switch group 40A. Thus, a write order is preferred to be changed for each frame. One example of the write order of the display signals into the pixels 7 will be described below with reference to FIG. 7. FIG. 7 is a conceptual view showing the write order to the pixels 7 on the adjacent scanning lines 4-1 and 4-2 from the first frame to the fourth frame. A symbol (for example, R1) on each pixel 7 is a symbol corresponding to the display signal written to the pixel 7, and the number inside the pixel 7 indicates the write order, and the + or − symbol indicates the polarity of the written signal.

As shown in FIG. 7, the pixels 7 connected to the scanning line 4-1 are driven in the time division in an order starting from the left side of FIG. 7 for each group of the data lines in the first and second frames (when the drive order is represented by using the symbols of the display signals supplied to the data lines, the order in the first group is of R1, G1, B1, R2, G2 and B2, and the order in the second group is of R3, G3, B3, R4, G4 and B4) Also, in the third and fourth frames, they are driven in an order starting from the right side of FIG. 7 for each group of the data lines (similarly, the order in the first group is of B2, G2, R2, B1, G1 and R1, and the order in the second group is of B4, G4, R4, B3, G3 and R3). The pixels 7 connected to the scanning line 4-2 are driven in an order starting from the right side of FIG. 7 for each group of the data lines in the first and second frames (similarly, the order in the first group is of B2, G2, R2, B1, G1 and R1, and the order in the second group is of B4, G4, R4, B3, G3 and R3). Also, in the third and fourth frames, they are driven in an order starting from the left side of FIG. 7 for each group of the data lines (similarly, the order in the first group is of R1, G1, B1, R2, G2 and B2, and the order in the second group is of R3, G3, B3, R4, G4 and B4). That is, the period between the times T1 and T13 shown in FIGS. 5A to 5K corresponds to a case where they are driven in the order starting from the left side, and the period between the times T14 and T26 corresponds to the example when they are driven in the order starting from the right side.

Second Embodiment

The display apparatus with the data line driving circuit 10 according to the second embodiment of the present invention will be described below with reference to FIG. 3 and FIGS. 8 to 11. The display apparatus 100 in the second embodiment includes a data line driving circuit 10B for performing a dot inversion drive on the pixel 7, as the data line driving circuit 10 in FIG. 3. The dot inversion drive is a driving method in which the polarities of the pixels 7 adjacent in the up, down, left and right directions are different. In the dot inversion drive, the voltage of the common electrode is typically fixed. Then, the polarity is inverted by the data line driving circuit 10B. In this embodiment, a case that the number of the data lines in one group is 3 will be described as one example. Here, the number of the data lines in one group is odd. Thus, the number of the data lines driven in one buffer 24 is 5 or 4. It should be noted that the number of the data lines and the number of the data lines driven by one buffer 24 are not limited thereto. If the gamma compensation is performed on the RGB independently of each other, the number of the data lines in one group is preferred to be 9, 15, to 6n+3 (n: natural number).

Figure 8:
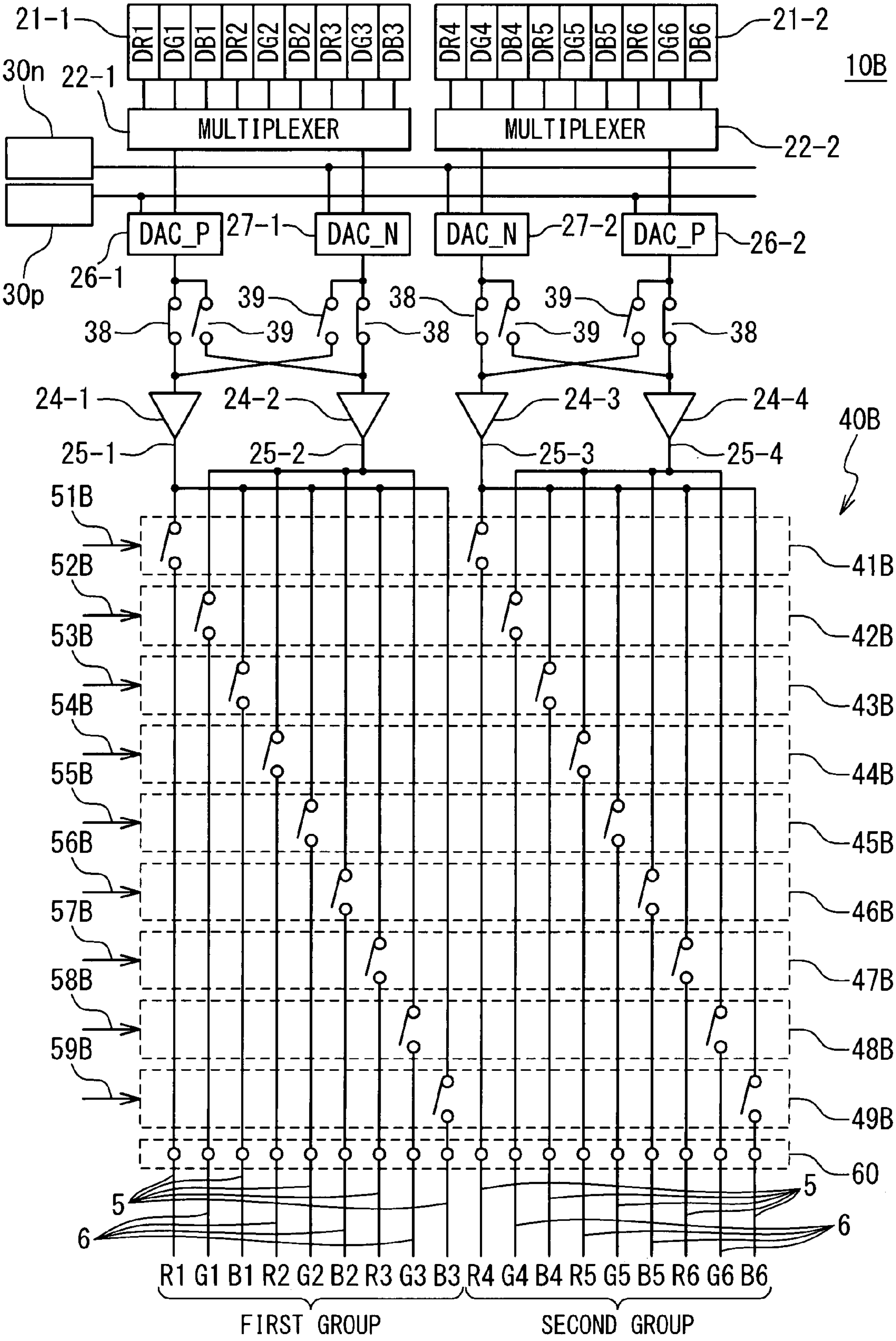
FIG. 8 is a circuit diagram showing a configuration of the data line driving circuit according to a second embodiment of the present invention.
Figure 9:
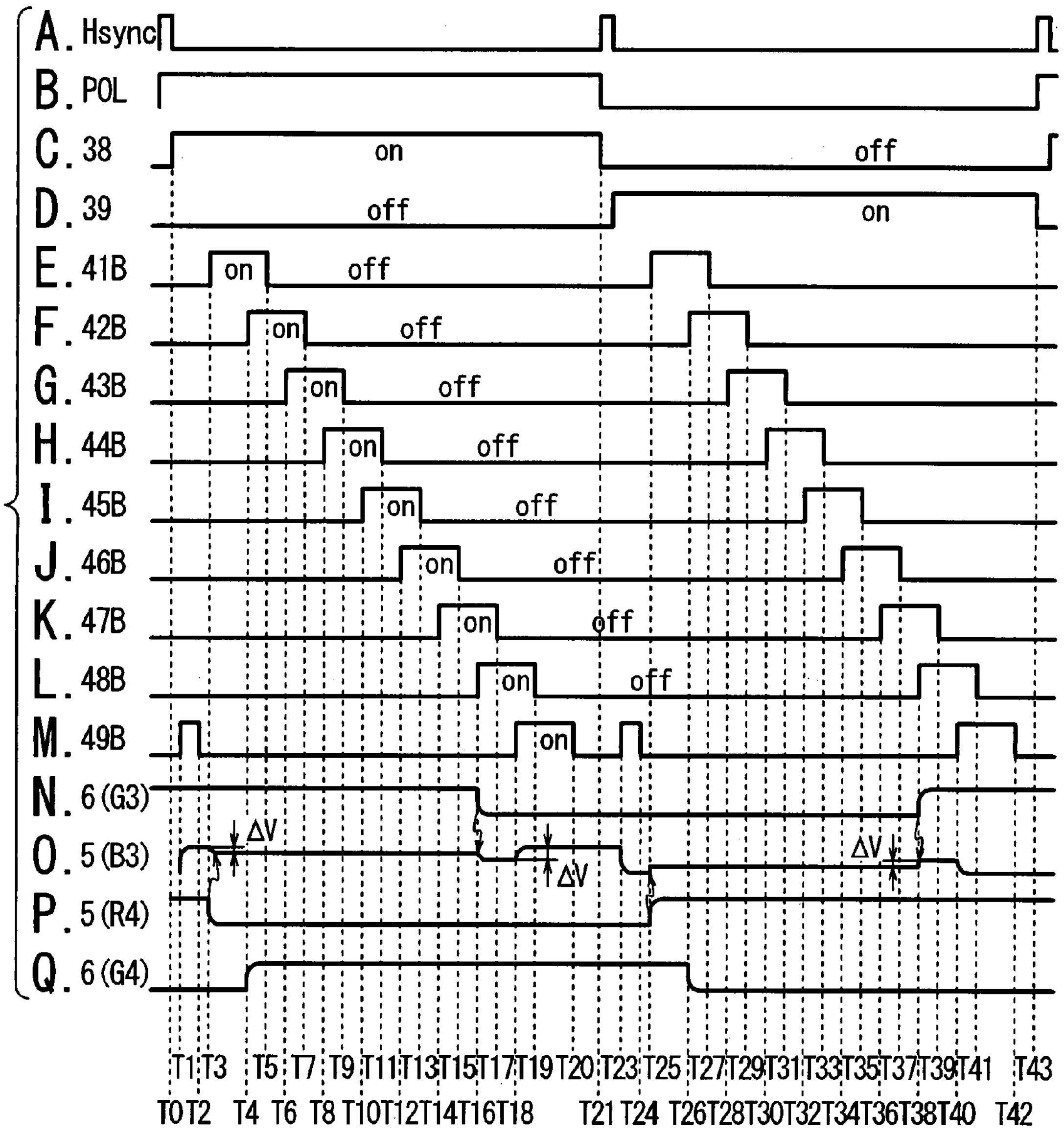
FIGS. 9A to 9Q are timing charts showing an operation of the data line driving circuit in the second embodiment.

Next, FIG. 8 is a circuit diagram showing the configuration of the data line driving circuit 10B in the second embodiment. The configuration of the data line driving circuit 10B in the second embodiment will be described below in detail with reference to FIG. 8. The data line driving circuit 10B includes the data latches 21, the multiplexers 22, DAC_Ps 26, DAC_Ns 27, the buffers 24, polarity switching switches 38 and 39, gray scale voltage generating circuits 30*n* and 30*p* and a time divisional switch group 40B. Moreover, shift registers, data registers and a frame memory, which are not shown, may be built therein. The multiplexer 22 and the time divisional switch group 40B are controlled by the control signal from the signal processing circuit 11.

The DAC_P 26 is connected to the gray scale voltage generating circuit 30*p* for generating the positive gray scale voltages V and outputs one positive gray scale voltage to the buffer 24. The DAC_N 27 is connected to the gray scale voltage generating circuit 30*n* for generating the negative gray scale voltages V and outputs the negative gray scale voltage to the buffer 24. The polarity switching switches 38 and 39 are provided between the DAC_P 26 and DAC_N 27 and the buffer 24, and the electric connection to or disconnection from the buffer 24 is controlled. The polarity switching switches 38 and 39 are controlled to be turned on or off in accordance with a polarity switching signal POL (not shown). When the polarity switch 39 is turned off, the polarity switch 38 is turned on, and DAC_Ps 26-1 and 26-2, and the buffers 24-1 and 24-4 are connected, and DAC_Ns 27-1 and 27-2 and the buffers 24-2 and 24-3 are connected. When the polarity switch 38 is turned off, the polarity switching switch 39 is turned on, and DAC_Ns 27-1 and 27-2 and the buffers 24-1 and 24-4 are connected, and the DAC_P 26-1 and 26-2 and the buffers 24-2 and 24-3 are connected. An output terminal 25 of the buffer 24 is connected through the time divisional switch group 40B to the data lines 5 and 6. The time divisional switch group 40B contains time divisional switches 41B to 49B and controls the electric connection or disconnection between the buffer 24 and the data lines 5 and 6.

In order to simplify the description, it is supposed that the display apparatus 100 according to this embodiment includes 10 data lines 5 and 8 data lines 6. It should be noted that the numbers of the data lines 5 and 6 provided in the display apparatus 100 are not limited thereto. Naturally, 18 or more data lines are usually provided. Output terminals 60 of the data line driving circuit 10B are connected to the data lines 5 and 6. The driver IC1 outputs the display signals R, G and B through the output terminal 60 to the data lines 5 and 6. It should be noted that [R, G, B] correspond to [Red, Green, Blue], respectively. Hereinafter, the data lines 5 and 6 to which the display signals R, G and B are supplied are referred to as the data lines 5 (R, G, B) and 6 (R, G, B), respectively. For example, the data line to which the display signal Rn is supplied is referred to as the data line 5 (Rn).

When the arrangement order of the data lines 5 and 6 provided on the display apparatus 100 in the second embodiment is represented by using the symbols of the display signals supplied to the data lines, they are arranged continuously in the row direction in the order of (R1, G1, B1, R2, G2, B2, R3, G3, B3, R4, G4, B4, R5, G5, B5, R6, G6 and B6). Here, the data lines to which the display signals R1, G1, B1, R2, G2, B2, R3, G3 and B3 are supplied are referred to as a first group, and the data lines to which the display signals R4, G4, B4, R5, G5, B5, R6, G6 and B6 are supplied is referred to as the second group. In the second embodiment, the data lines 5 and 6 inside the same group are alternately arranged. For this reason, the display signals R1, B1, G2, R3, B3, R4, B4, G5, R6 and B6 are supplied to the (ten) data lines 5, and the display signals G1, R2, B2, G3, G4, R5, B5 and G6 are supplied to the (eight) data lines 6.

The data line driving circuit 10B in the second embodiment includes the buffers 24-1 and 24-3 whose output terminals 25-1 and 25-3 are respectively connected to the five data lines 5, and the buffers 24-2 and 24-4 whose output terminals 25-2 and 25-4 are respectively connected to the four data lines 6. In detail, the buffer 24-1 is connected to the data lines 5 (R1, B1, G2, R3 and B3), and the buffer 24-3 is connected to the data lines 5 (R4, B4, G5, R6 and B6). Also, the buffer 24-2 is connected to the data lines 6 (G1, R2, B2 and G3), and the buffer 24-4 is connected to the data lines 6 (G4, R5, B5 and G6).

With reference to FIG. 8, the data line driving circuit 10B includes the data latch 21-1 for outputting the display data DR, DG and DB to the data lines 5 and 6 in the first group; and the data latch 21-2 for outputting the display data DR, DG and DB to the data lines 5 and 6 in the second group. Also, the data line driving circuit 10B includes the multiplexer 22-1 connected to the data latch 21-1 to select the display data inside the data latch 21-1 and to output to the DAC_P 26-1 and the DAC_N 27-1; and the multiplexer 22-2 connected to the data latch 21-2 to select the display data inside the data latch 21-2 and to output to the DAC_P 26-2 and the DAC_N 27-2. Moreover, DAC_P 26-1 and DAC_N 27-1 are connected through the polarity switching switches 38 and 39 to the buffer 24-1 and the buffer 24-2, and the DAC_P 26-2 and the DAC_N 27-2 are connected through the polarity switching switches 38 and 39 to the buffer 24-3 and the buffer 24-4. It should be noted that the description is made under the assumption that the number of the buffers 24 is 4 correspondingly to the number (18) of the data lines 5 and 6. However, the number may be naturally increased or decreased in correspondence to the numbers of the data lines 5 and 6. Also, the numbers of the data lines 5 and 6 connected to one buffer 24 are not limited thereto.

The time divisional switch group 40B will be described below in detail. The time divisional switches 41B, 43B, 45B, 47B and 49B serving as the first switches are provided between the buffer 24-1 and the data lines 5 (R1, B1, G2, R3 and B3), respectively. Also, the time divisional switches 42B, 44B, 46B and 48B serving as the second switches are provided between the buffer 24-2 and the data lines 6 (G1, R2, B2 and G3), respectively. Similarly, the time divisional switches 41B, 43B, 45B, 47B and 49B serving as the first switches are provided between the buffer 24-3 and the data lines 5 (R4, B4, G5, R6 and B6), respectively. Also, the time divisional switches 42B, 44B, 46B and 48B serving as the second switches are provided between the buffer 24-4 and the data lines 6 (G4, R5, B5 and G6), respectively. In this embodiment, one group is driven by the two buffers 24, and each buffer 24 drives the data lines for every n or m (m=n−1) in the time division. The time divisional switches 41B to 49B connected to the data lines in one group are respectively controlled by the (n+m) control signals 51B to 59B generated by the signal processing circuit 11.

Next, the data line driving operation of the data line driving circuit 10B according to the present invention will be described below with reference to FIGS. 9A to 9Q. FIGS. 9A to 9Q are timing charts showing the operation of the time divisional switch group 40B and polarity switching switches 38 and 39 in the two horizontal periods and the signal levels of the data lines 5 (G3), 6 (B3), 5 (R4) and 6 (G4) to which the display signals G3, B3, R4 and G4 are supplied. It should be noted that the data lines 5 (G3), 6 (B3), 5 (R4) and 6 (G4) are continuously arranged, as shown in FIG. 8.

The display data DR, DG and DB held in the data register or frame memory in the horizontal period corresponding to the horizontal synchronization signal Hsync are latched by the data latch 21.

Between times T0 and T21 in the first horizontal period of the first frame, the polarity switching switch 38 is turned on, and the voltages selected by the DAC_Ps 26-1 and 26-2 are supplied to the buffers 24-1 and 24-4, respectively, and the voltages selected by the DAC_Ns 27-1 and 27-2 are supplied to the buffers 24-2 and 24-3, respectively. Also, in the periods before and after the time T1, the first scanning line 4 is made active, the TFTs of the pixels 7 connected to the scanning line are turned on, and the display signals are written to the pixels 7, respectively. After a time T20, the first scanning line 4 is made inactive, the TFTs are turned off, and the display signals at that time are held in the pixels 7, respectively. Similarly, between times T22 and T43 in the second horizontal period of the second frame, the polarity switching switch 39 is turned on, and the voltages selected by the DAC_Ps 26-1 and 26-2 are supplied to the buffers 24-2 and 24-3, respectively, and the voltages selected by the DAC_Ns 27-1 and 27-2 are supplied to the buffers 24-1 and 24-4, respectively. Also, in the periods before and after a time T23, the second scanning line 4 is made active, the TFTs of the pixels 7 connected to the scanning line are turned on, and the display signals are written to the pixels 7, respectively. After a time T42, the second scanning line 4 is made inactive, the TFTs are turned off, and the display signals at that time are held in the pixels 7, respectively.

At first, at a time T1, the multiplexer 22-1 selects the display data DB3 to send to the DAC_P26-1. The multiplexer 22-2 selects the display data DB6 to send to the DAC_N27-2. Also, the control signal 59B turns on the time divisional switch 49B, and the buffer 24-1 positively drives the data line 5 (B3), and the buffer 24-3 negatively drives the data line 5 (B6). Thus, the data line 5 (B3) originally arranged on the boundary between the first and second groups is driven.

Next, at a time T2, the control signal 59B turns off the time divisional switch 49B. Thus, the data lines 5 (B3) and 5 (B6) are disconnected from the buffers 24-1 and 24-3 and hold the display signals corresponding to the display data. The respective pixels connected to the data lines 5 (B3) and 5 (B6) are driven through the TFTs. However, since the TFT is high in the on resistance, the pixel 7 is not required to arrive at the target voltage. Then, a period between the times T1 and T2 may be a period until the data line arrives at the target voltage.

Next, at a time T3, the multiplexer 22-1 selects the display data DR1 to send to the DAC_P26-1. The multiplexer 22-2 selects the display data DR4 to send to the DAC_N27-2. Also, the control signal 51B turns on the time divisional switch 41B, the buffer 24-1 positively drives the data line 5 (R1), and the buffer 24-3 negatively drives the data line 5 (R4). At this time, the data line 5 (B3) adjacent to the data line 5 (R4) is varied by ΔVc1 (a number to be added to the ΔVc indicates the number of times of the variations) because of the coupling capacitance. The time to prevent interference between the time divisional switches connected to one buffers is set for a period between the times T2 and T3. Also, after the time divisional switch 49B is turned off, the time divisional switch 41B is turned on.

At a time T4, the time divisional switch 41B is on. Also, the multiplexer 22-1 selects the display data DG1 to send to the DAC_N27-1. The multiplexer 22-2 selects the display data DG4 to send to the DAC_P26-2. Also, the control signal 52B turns on the time divisional switch 42B, the buffer 24-2 negatively drives the data line 6 (G1), and the buffers 24-4 positively drives the data line 6 (G4). At this time, the data lines 5 (R1) and 5 (R4) adjacent to the data lines 6 (G1) and 6 (G4) are connected to the buffer and low in impedance. Thus, the voltage variation caused by the coupling capacitance is never involved.

Next, at a time T5, the control signal 51B turns off the time divisional switch 41B. Thus, the data lines 5 (R1) and 5 (R4) are disconnected from the buffers 24-1 and 24-3 and hold the display signals corresponding to the display data. In the period between the times T4 and T5, the data lines 6 (G1) and 6 (G4) arrive at the target voltages. Thus, the data lines 5 (R1) and 5 (R4) do not receive any influences of the coupling capacitances from the adjacent data lines 6 (G1) and 6 (G4). Therefore, they are disconnected from the buffers 24-1 and 24-3.

At a time T6, the time divisional switch 42B is on. Also, the multiplexer 22-1 releases the selection of the display data DR1 and newly selects the display data DB1 to send to the DAC_P26-1. The multiplexer 22-2 releases the selection of the display data DR4 and newly selects the display data DB4 to send to the DAC_N27-2. Also, the control signal 53B turns on the time divisional switch 43B, the buffer 24-1 positively drives the data line 5 (B1), and the buffer 24-3 negatively drives the data line 5 (B4). The time to prevent an interference between the time divisional switches connected to one buffer is set for the period between the times T5 and T6. Also, after the time divisional switch 41B is turned off, the time divisional switch 43B is turned on.

Next, at a time T7, the control signal 52B turns off the time divisional switch 42B. Thus, the data lines 6 (G1) and 6 (G4) are disconnected from the buffers 24-2 and 24-4 and hold the display signals corresponding to the display data. In the period between the times T6 and T7, the data lines 5 (B1) and 5 (B4) arrive at the target voltages. Therefore, the data lines 6 (G1) and 6 (G4) do not receive the influences of the coupling capacitances from the data lines 5 (B1) and 5 (B4), and they are disconnected from the buffers 24-2 and 24-4. Hereinafter, between the times T8 and T15, the operation similar to those between the times T3 and T7 is repeated. Therefore, the description is omitted.

At a time T16, the time divisional switch 47B is on. Also, the multiplexer 22-1 releases the selection of the display data DB2 and newly selects the display data DG3 to send to the DAC_N27-1. The multiplexer 22-2 releases the selection of the display data DB5 and newly selects the display data DG6 to send to the DAC_P26-2. Also, the control signal 48B turns on the time divisional switch 48B, the buffer 24-2 negatively drives the data line 6 (G3), and the buffer 24-4 positively drives the data line 6 (G6). At this time, the data lines 5 (B3) and 5 (B6) adjacent to the data lines 6 (G3) and 6 (G6) receive the influence of the coupling capacitance. The data lines 5 (B3) and 5 (B6) are different in polarity from the adjacent data lines 6 (G3) and 6 (G6). Thus, the voltages are varied by ΔVc2 (a number to be added to ΔVc indicates the number of the variations) in the same direction two times.

Next, at a time T17, the control signal 57B turns off the time divisional switch 47B. Thus, the data lines 5 (R3) and 5 (R6) are disconnected from the buffers 24-1 and 24-3 and hold the display signals corresponding to the display data. In the period between the times T16 and T17, the data lines 6 (G3) and 6 (G6) arrive at the target voltages. Thus, since the data lines 5 (R3) and 5 (R6) do not receive the influences of the coupling capacitances from the data lines 6 (G3) and 6 (G6), they are disconnected from the buffers 24-1 and 24-3.

Next, at a time T18, the control signal 59B turns on the time divisional switch 49B. Again, the data lines 5 (B3) and 5 (B6) are driven by the buffers 24-1 and 24-3. Although the data line 5 (B3) arrives at the target voltage in the period between the times T1 and T2, the voltage is varied by ΔVc2 because of the coupling capacitances of the adjacent data lines 6 (G3) and 6 (R4) at the time T16. However, since the data line 5 (B3) is again driven by the display signals B3 and B6, the voltage variation is compensated. Also, the data line 5 (B6) is similar. In a period between the times T18 and T19, the data line 5 (B3) is compensatively driven by the ΔVc2. However, the data line 6 (R4) receives the influence of the coupling capacitance of the data line 5 (B3) and receives an influence by ΔVc2'. However, this ΔVc2' is about 1/100 of ΔVc2, namely, about 1 mV, which is in the level having no influence on the image quality.

Next, at a time T19, the control signal 58B turns off the time divisional switch 48B. Thus, the data lines 6 (G3) and 6 (G6) are disconnected from the buffers 24-2 and 24-4 and hold the display signals corresponding to the display data.

Next, at a time T20, the control signal 59B turns off the time divisional switch 49B. Thus, the data lines 5 (B3) and 5 (B6) are disconnected from the buffers 24-1 and 24-3 and hold the display signals corresponding to the display data.

As mentioned above, the operation between the times T0 and T21 is performed in one horizontal period. Also, when the scanning line 4 is described, before and after the time T1, the scanning line driving circuit 12 makes the first scanning line 4 active, the TFTs connected to the first scanning line 4 are turned on, and the display signals R, G and B sent to the data lines 5 and 6 are written to the pixels 7. Then, after the time T20, the first scanning line 4 is made inactive, the TFTs are turned off, and the display signals R, G and B sent to the data lines 5 and 6 are held in the pixels 7. The period until the scanning line 4 is made inactive after the time T20 reserves the period when the pixel 7 arrives at the target voltage. Between the times T22 and T43 on the second scanning line in the first frame, the polarity switching switch 39 is turned on, and the gray scale voltages selected by the DAC_Ps 26-1 and 26-2 are supplied to the buffers 24-2 and 24-3, respectively, and the gray scale voltages selected by the DAC_Ns 27-1 and 27-2 are supplied to the buffers 24-1 and 24-4, respectively. Hereinafter, the part between the times T23 and T42 is operated similarly to the part between the times T1 and T20.

As for the polarity switching switches 38, 39, on the first scanning line in the second frame, the polarity switching switch 39 is turned on, and on the second scanning line in the second frame, the polarity switching switch 38 is turned on. With regard to the polarity switching switches, the operation over the first and second frames is repeated on and after the third frame.

As mentioned above, in the data line driving circuit 10B according to the present invention, the voltage of the data line (here, the data line 5 (B3) in the first group) adjacent to the different group is greatly varied by the coupling capacitance of the data lines (the data line 6 (G3) and the data line 5 (R4)), which are adjacent thereto on the left and right sides, two times. However, since the data line 5 (B3) is again driven after the voltage variation, this voltage variation is canceled. Also, in the data line other than the data line (here, the data line 5 (R4)) adjacent to the different group, there is no voltage variation caused by the coupling capacitance. The data line adjacent to the different group receives an influence of the coupling capacitance of the data line driven to the data line (the data line 5 (B3)) in the adjacent different group, and varied from the target voltage value by about 1 mV in the worst case. However, its variation amount is in the level at which the display unevenness is not generated. Moreover, the sensibility of the color G (green) displayed on the display apparatus is superior to R (red) and B (blue). Thus, in the data line driving circuit 10B, at first, the data line is preferred not to be driven by the display signal G and preferred to be driven by the display signal of the different color.

In the dot inversion drive, the positive and negative display signals are sent to the different data lines at the same time. Thus, the positive gray scale voltage generating circuit 30$p$ and the negative gray scale voltage generating circuit 30$n$ are provided. Even in this embodiment, similarly to the first embodiment, if the number of the data lines in one group is the multiple of 3, the gray scale voltage generating circuits 30$p$ and 30$n$ can perform the gamma compensation independently of each other for each of R, G and B.

Figure 10:
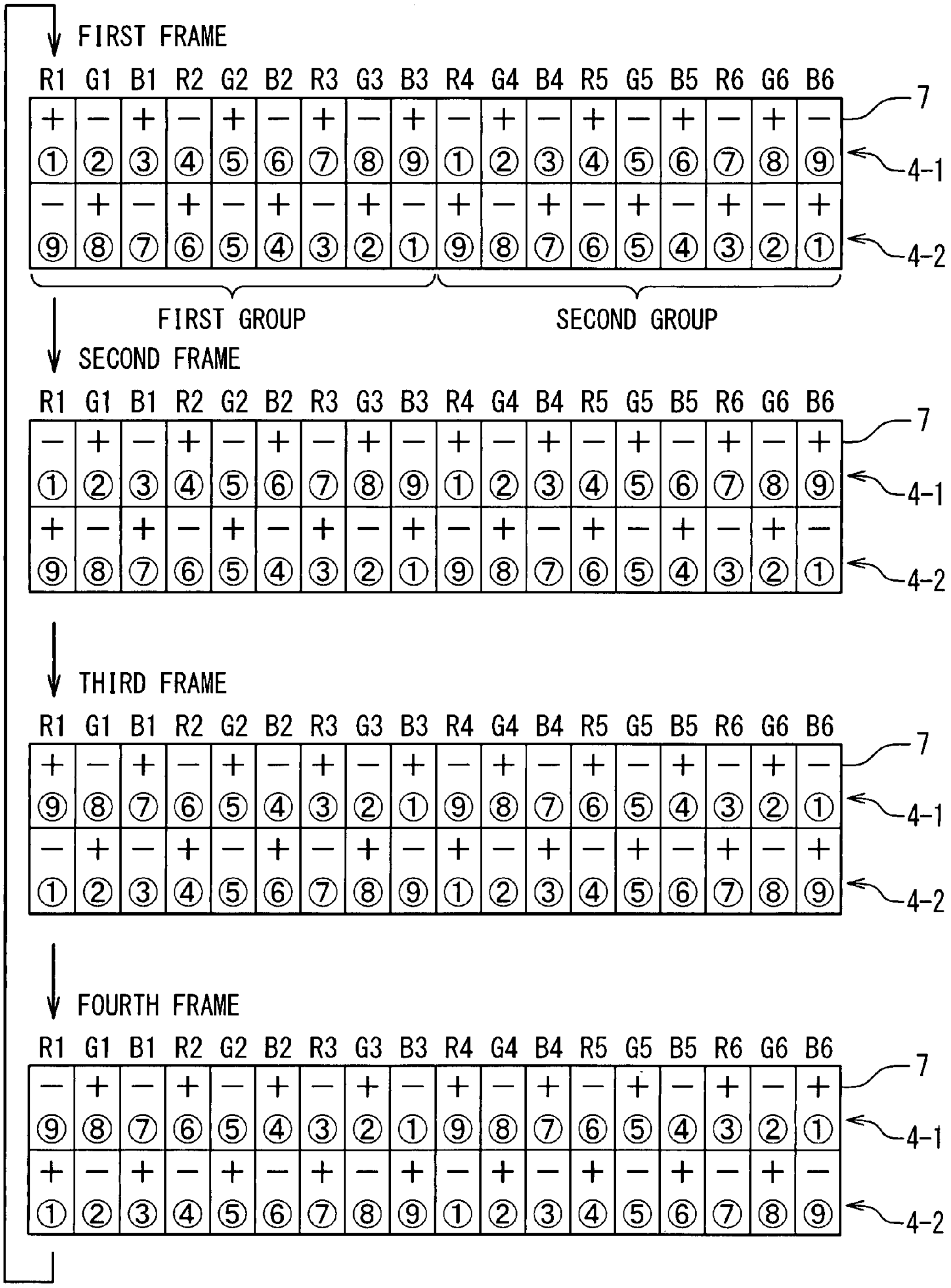
FIG. 10 is a conceptual view showing a write order of pixels of the data line driving circuit in the second embodiment.

The display unevenness results from not only the voltage variation caused by the coupling capacitance of the adjacent data line, but also the leak of the TFT and the leak in the time divisional switch group 40B. Thus, the write order is preferred to be changed for each frame. One example of the write order of the display signals to the pixel 7 will be described below with reference to FIG. 10. FIG. 10 is a conceptual view showing the write order to the pixel 7 on the adjacent scanning lines 4-1 and 4-2 from the first frame to the fourth frame. The symbol (for example, R1) on each pixel 7 is the symbol corresponding to the display signal written to the pixel 7, and the number inside the pixel 7 indicates the write order, and the + or − symbol indicates the polarity of the written signal.

For example, on the first scanning line of FIG. 10, they are driven in an order starting from the left side in the first and second frames and driven in an order starting from the right side in the third and fourth frames. On the second scanning line, they are driven in an order starting from the right side in the first and second frames and driven in an order starting from the left side in the third and fourth frames.

As shown in FIG. 10, the pixels 7 connected to the scanning line 4-1 are driven in the time division in the order starting from the left side of FIG. 10 for each group of the data lines, in the first and second frames (when the drive order is represented by using the symbols of the display signals supplied to the data lines, in the first group, the order of R1, G1, B1, R2, G2, B2, R3, G3 and B3, and in the second group, the order of, R4, G4, B4, R5, G5, B5, R6, G6 and B6). Also, in the third and fourth frames, they are driven in the order starting from the right side of FIG. 10 for each group of the data lines (similarly, in the first group, the order of B3, G3, R3, B2, G2, R2, B1, G1 and R1), and in the second group, the order of B6, G6, R6, B5, G5, R5, B4, G4 and R4). The pixels 7 connected to the scanning line 4-2 are driven in the order starting from the right side of FIG. 10 for each group of the data lines in the first and second frames (similarly, in the first group, the order of B3, G3, R3, B2, G2, R2, B1, G1 and R1), and in the second group, the order of B6, G6, R6, B5, G5, R5, B4, G4 and R4). Also, in the third and fourth frames, they are driven in the order starting from the left side of FIG. 10 for each group of the data lines (similarly, in the first group, the order of R1, G1, B1, R2, G2, B2, R3, G3 and B3), and in the second group, the order of R4, G4, B4, R5, G5, B5, R6, G6 and B6). That is, the period between the times T0 and T21 shown in FIGS. 9A to 9Q corresponds to a case that they are driven in the order starting from the left side, and the period between the times T22 and T42 corresponds to an example when they are driven in the order starting from the right side.

Also, when the pixels 7 on the data line 5 (R1) on the first scanning line are assumed such as "Polarity and Order of First Frame", "Polarity and Order of Second Frame", "Polarity and Order of Third Frame", and "Polarity and Order of Fourth Frame", they are driven in the order of [+1, −1, +9, −9] in FIG. 10. However, they may be driven in the order of [+1, −9, +9, −1]. The other pixels 7 are similar.

Figure 11:
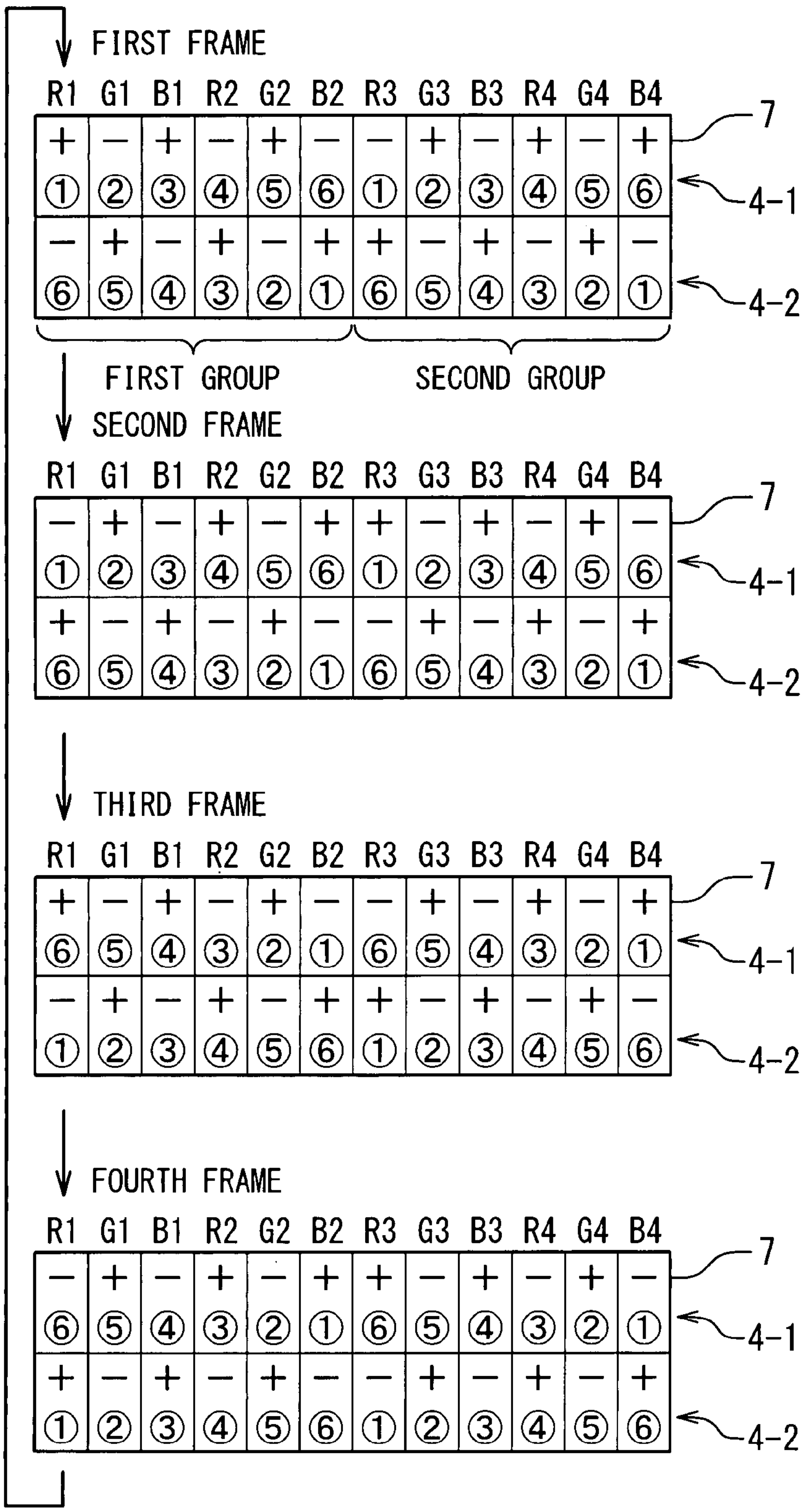
FIG. 11 is a conceptual view showing a write order of pixels of the data line driving circuit in a combination of the first and second embodiments.

The first embodiment has been described by using an example that the number of the data lines in one group is 6 and the pixels 7 are driven under the line inversion. Also, the second embodiment has been described by using an example that the number of the data lines in one group is 9 and the pixels 7 are driven under the dot inversion in which the polarities are different in the four directions of the left, right, up and down directions. However, they can be driven such that the first and second embodiments are combined, and as shown in FIG. 11, the number of the data lines in one group is 6 and only the polarities of the pixels between the groups are different in the three directions.

Third Embodiment

The data line driving circuit 10 according to the third embodiment of the present invention will be described below with reference to FIG. 3 and FIG. 12, FIGS. 13A to 13G, and FIG. 14. The display apparatus 100 in the third embodiment includes a data line driving circuit 10C for performing a dot inversion drive on the pixel 7, as the data line driving circuit 10 in FIG. 3. The dot inversion drive is a drive method so that the polarities of the pixels 7 adjacent to each other in the up, down, left and right directions are different. In the dot inversion drive, the voltage of the common electrode is typically fixed. Then, the polarity is inverted by the data line driving circuit 10C. In this embodiment, a case that the number of the data lines in one group is 6 will be described as one example.

Figure 12:
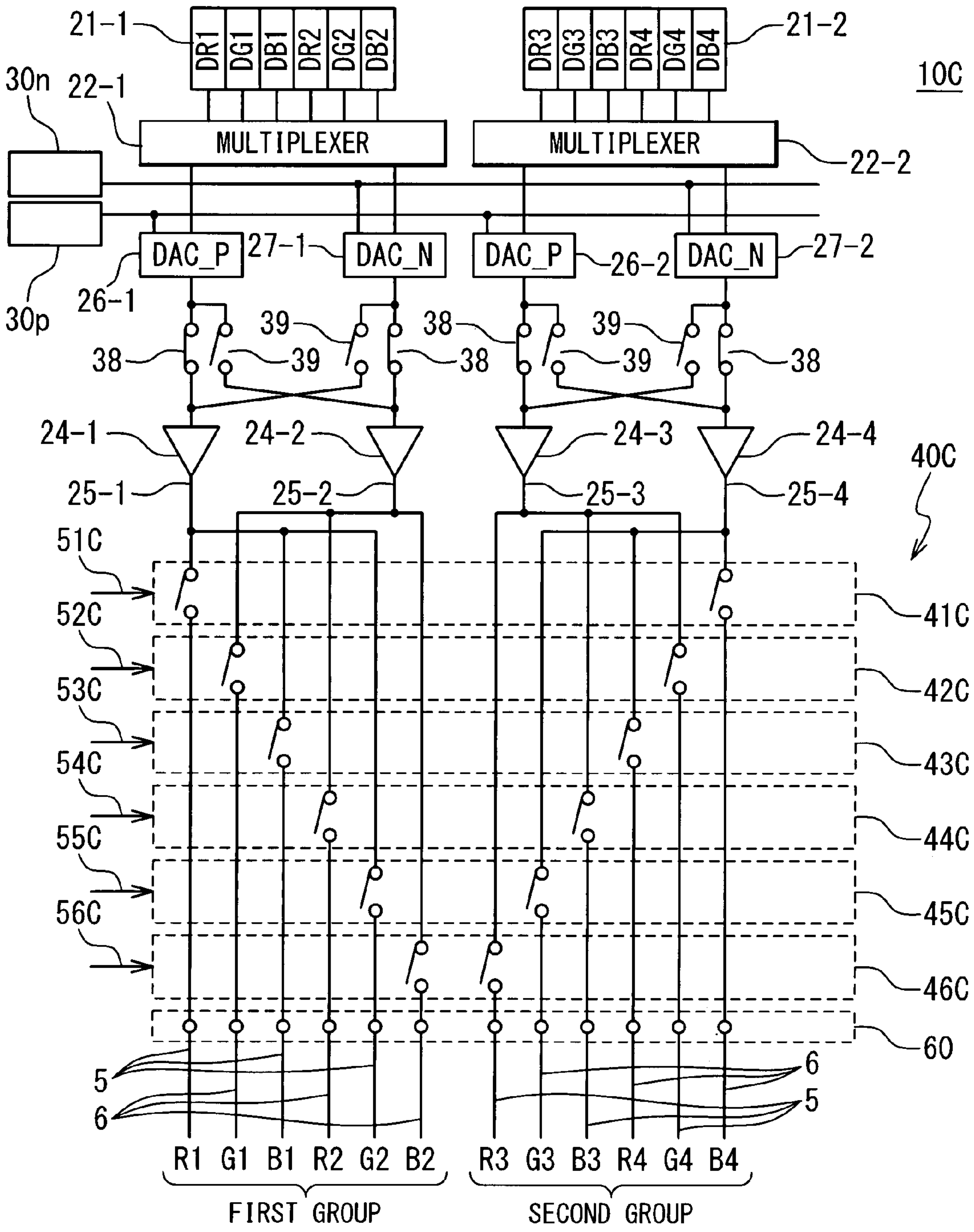
FIG. 12 is a circuit diagram showing a configuration of the data line driving circuit according to a third embodiment of the present invention.
Figure 13:
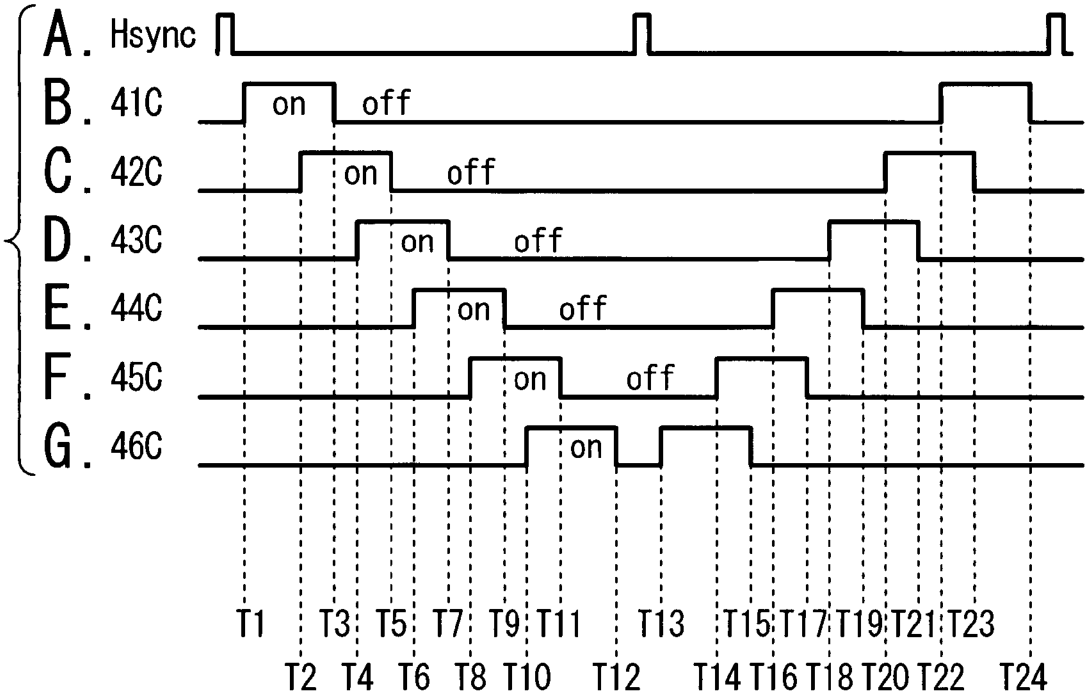
FIGS. 13A to 13G are timing charts an operation of the data line driving circuit in the third embodiment.

FIG. 12 is a circuit diagram showing the configuration of the data line driving circuit 10C in the third embodiment. The configuration of the data line driving circuit 10C in the third embodiment will be described below in detail with reference to FIG. 12. The data line driving circuit 10C includes the data latches 21, the multiplexers 22, the DAC_Ps 26, the DAC_Ns 27, the buffers 24, the polarity switching switches 38 and 39, the gray scale voltage generating circuits 30$n$ and 30$p$ and a time divisional switch group 40C. Moreover, the shift registers, the data registers, and the frame memory, which are not shown, may be built therein. The multiplexer 22 and the time divisional switch group 40C are controlled in response to the control signals from the signal processing circuit 11.

The DAC_P 26 is connected to the gray scale voltage generating circuit 30$p$ which generates the positive gray scale voltages V and outputs a positive display signal to the buffer 24. The DAC_N 27 is connected to the gray scale voltage generating circuit 30$n$ which generates the negative gray scale voltages V and outputs a negative display signal to the buffer 24. The polarity switching switches 38 and 39 are provided between the DAC_Ps 26 and DAC_Ns 27 and the buffers 24, and the connection to the buffer 24 is controlled. The polarity switching switches 38 and 39 are controlled to be turned on or off in accordance with the polarity switching signal POL (not shown). When the polarity switch 39 is turned off, the polarity switch 38 is turned on, and the DAC_Ps 26 and the buffers 24 are connected. When the polarity switch 38 is turned off, the polarity switching switch 39 is turned on, and the DAC_Ns 27 and the buffers 24 are connected. The output terminals 25 of the buffers 24 are connected through the time divisional switch group 40C to the data lines 5 and 6. The time divisional switch group 40C contains time divisional switches 41C to 49C and controls the connection between the buffers 24 and the data lines 5 and 6.

Here, the data line 5 and the data line 6 are the plurality of data lines that are alternately arranged. In order to simplify the description, the display apparatus 100 according to this embodiment is assumed to have the total of 12 data lines composed of the six data lines 5 and six data lines 6. It should be noted that the numbers of the data lines 5 and 6 provided in the display apparatus 100 are not limited thereto. Naturally, 12 or more data lines are usually provided. The output terminal 60 of the data line driving circuit 10C is connected to the data lines 5 and 6, and the driver IC1 outputs the display signals R, G and B through the output terminal 60 to the data lines 5 and 6. It should be noted that [R, G, B] correspond to [Red, Green, Blue], respectively. Hereinafter, the data lines 5 and 6 to which the display signals R, G and B are supplied are referred to as the data line 5 (R, G, B), the data line 6 (R, G, B), respectively. For example, the data line to which the display signal Rn is supplied is referred to as the data line 5 (Rn).

When the arrangement order of the data lines 5 and 6 provided in the display apparatus 100 in the third embodiment is represented by using the symbols of the display signals supplied to the data lines, they are arranged in the order of (R1, G1, B1, R2, G2, B2, R3, G3, B3, R4, G4 and B4) continuously in the row direction. Since the data line 5 and the data line 6 are alternately arranged, the display signals R1, B1, G2, R3, B3 and G4 are supplied to the data line 5, and the display signals G1, R2, B2, G3, R4 and B4 are supplied to the data line 6.

The data line driving circuit 10C in this embodiment includes the buffers 24-1 and 24-3 whose output terminals 25-1 and 25-3 are connected to the 3 data lines 5, respectively; and the buffers 24-2 and 24-4 whose output terminals 25-2 and 25-4 are connected to the 3 data lines, respectively. In detail, the buffer 24-1 is electrically connected to or disconnected from the data lines 5 (R1, B1 and G2), and the buffer 24-3 is electrically connected to or disconnected from the data lines 5 (R3, B3 and G4). Also, the buffer 24-2 is electrically connected to or disconnected from the data lines 6 (G1, R2 and B2), and the buffer 24-4 is electrically connected to or disconnected from data lines 6 (G3, R3 and B4).

With reference to FIG. 12, the data line driving circuit 10C includes the data latch 21-1 for sending the display data DR, DG and DB to the data lines 5 and 6 in the first group; and the data latch 21-2 for sending the display data DR, DG and DB to the data lines 5 and 6 in the second group. Also, the data line driving circuit 10C includes the multiplexer 22-1 that is connected to the data latch 21-1, selects the display data inside the data latch 21-1 and outputs to the DAC_P 26-1 and the DAC_N 27-1; and the multiplexer 22-2 that is connected to the data latch 21-2, selects the display data inside the data latch 21-2 and outputs to the DAC_P 26-2 and the DAC_N 27-2. Moreover, the DAC_P 26-1 and the DAC_N 27-1 are connected through the polarity switching switches 38 and 39 to the buffers 24-1 and 24-2, and the DAC_P 26-2 and the DAC_N 27-2 are connected through the polarity switching switches 38 and 39 to the buffers 24-3 and 24-4. Here, the description is given under the assumption that the number of the buffers 24 is 4 correspondingly to the number (12) of the data lines 5 and 6. However, the number is naturally increased or decreased correspondingly to the numbers of the data lines 5 and 6. Also, when the numbers of the data lines 5 and 6 connected to one buffer 24 are the multiple of 3, they may not be limited to 3.

The time divisional switch group 40C will be described below in detail. The time divisional switches 41C, 43C and 45C serving as the first switches are provided between the buffer 24-1 and the data lines 5 (R1, B1 and G2), respectively. Also, the time divisional switches 42C, 44C and 46C serving as the second switches are provided between the buffer 24-2 and the data lines 6 (G1, R2 and B2, respectively. Similarly, the time divisional switches 46C, 44C and 42C serving as the second switches are provided between the buffer 24-3 and the data lines 5 (R3, B3 and G4), respectively. Also, the time divisional switches 45C, 43C and 41C serving as the first switches are provided between the buffer 24-4 and the data lines 6 (G3, R4 and B4), respectively. The time divisional switches 41C to 46C are controlled in response to the control signals 51C to 56C generated by the signal processing circuit 11, respectively. Here, the data lines to which the display signals R1, G1, B1, R2, G2 and B2 are supplied are defined as the first group, and the data lines to which the display signals R3, G3, B3, R4, G4 and B4 are supplied are defined as the second group. In case of 1/n time division drive according to the conventional technique, the time divisional switches are controlled by n control signals. However, in this embodiment, one group is driven by the two buffers 24, and each of the buffers 24 drives the n data lines in the time division, and the time divisional switches connected to one group are controlled in response to the (n+n) control signals. For example, the time divisional switches 41C to 46C connected to the data lines in the first group (or second group) are controlled by the 6 control signals 51C to 56C.

The data line driving operation of the data line driving circuit 10C according to the present invention will be described below with reference to FIGS. 13A to 13G. FIGS. 13A to 13G are timing charts showing the operation of the time divisional switch group 40C and polarity switching switches 38 and 39 in the two horizontal periods.

The display data DR, DG and DB held in the data register or frame memory in the horizontal period based on the horizontal synchronization signal Hsync are latched by the data latch 21.

In the first horizontal period of the first frame, the polarity switching switch 38 is turned on, and the voltages selected by the DAC_Ps 26-1 and 26-2 are supplied to the buffers 24-1 and 24-3, respectively, and the voltages selected by the DAC_Ns 27-1 and 27-2 are supplied to the buffers 24-2 and 24-4, respectively. Also, in the first horizontal period, the first scanning line 4 is made active, the TFTs of the pixels 7 connected to the scanning line are turned on, and the display signals are written to the pixels 7, respectively. Just after the end of the first horizontal period, the TFTs are turned off, and the display signals at that time are held in the pixels 7, respectively. Similarly, in the second horizontal period of the second frame, the polarity switching switch 39 is turned on, and the voltages selected by the DAC_Ps 26-1 and 26-2 are supplied to the buffers 24-2 and 24-4, respectively, and the voltages selected by the DAC_Ns 27-1 and 27-2 are supplied to the buffers 24-1 and 24-3, respectively. Also, in the second horizontal period, the second scanning line 4 is made active, the TFTs of the pixels 7 connected to the scanning line are turned on, and the display signals are written to the pixels 7, respectively. Just after the end of the second horizontal period, the TFTs are turned off, and the display signals at that time are held in the pixels 7, respectively.

At first, at a time T1, the multiplexer 22-1 selects the display data DR1 to send to the DAC_P26-1. The multiplexer 22-2 selects the display data DB4 to send to the DAC_N27-2. Also, the control signal 51C turns on the time divisional switch 41C, and the buffer 24-1 positively drives the data line 5 (R1), and the buffer 24-4 negatively drives the data line 6 (B4).

Next, at a time T2, the time divisional switch 41A is turned on. Also, the multiplexer 22-1 selects the display data DG1 to send to the DAC_N 27-1. The multiplexer 22-2 selects the display data DG4 to send to the DAC_P 26-2. Also, the control signal 52C turns on the time divisional switch 42C, the buffer 24-2 negatively drives the data line 6 (G1), and the buffer 24-3 positively drives the data line 5 (G4). At this time, the data lines 5 (R1) and 6 (B4) adjacent to the data lines 6 (G1) and 5 (G4) are connected to the buffers and low in impedance. Thus, there is no voltage variation caused by the coupling capacitance.

Next, at a time T3, the control signal 51C turns off the time divisional switch 41C. Thus, the data lines 5 (R1) and 6 (B4) are disconnected from the buffers 24-1 and 24-4 and hold the display signals corresponding to the display data. In the period between the times T2 and T3, the data lines 6 (G1) and 5 (G4) arrive at the target voltages. Thus, the data lines 5 (R1) and 6 (B4) do not receive the influences of the coupling capacitances from the adjacent data lines 6 (G1) and 5 (G4), and they are disconnected from the buffers 24-1 and 24-4.

At a time T4, the time divisional switch 42C is turned on. Also, the multiplexer 22-1 releases the selection of the display data DR1 and newly selects the display data DB1 to send to the DAC_P 26-1. The multiplexer 22-2 releases the selection of the display data DB4 and newly selects the display data DR4 to send to the DAC_N 27-2. Also, the control signal 53C turns on the time divisional switch 43C, the buffer 24-1 positively drives the data line 5 (B1), and the buffer 24-4 negatively drives the data line 6 (R4). The time to prevent an interference between the time divisional switches connected to one buffer is set for the period between the times T3 and T4. Also, after the time divisional switch 41C is turned off, the time divisional switch 43C is turned on.

Next, at a time T5, the control signal 52C turns off the time divisional switch 42C. Thus, the data lines 6 (G1) and 5 (G4) are disconnected from the buffers 24-2 and 24-3 and hold the display signals corresponding to the display data. In the period between the times T4 and T5, the data lines 5 (B1) and 6 (R4) arrive at the target voltages. Therefore, the data lines 6 (G1) and 5 (G4) do not receive the influences of the coupling capacitances from the data lines 5 (B1) and 6 (R4), and they are disconnected from the buffers 24-2 and 24-4. Hereinafter, between the times T6 and T12, the operation similar to those between the times T1 and T5 are repeated. Therefore, the description will be omitted.

Here, at a time T10, when the time divisional switch 46C is turned on, the display signals B2 and R3 are supplied to the adjacent data line 6 (B2) and data line 5 (R3) at the same time. Also, at a time T12, when the time divisional switch 46C is turned off, disconnection is carried out between the data line 6 (B2) and the buffer 24-2 and between the data line 5 (R3) and the buffer 24-3 at the same time. Thus, the adjacent data line 6 (B2) and data line 5 (R3) are driven at the target voltage value without any the influence of the coupling capacitance between each other.

As mentioned above, the operation between the times T1 and T12 is performed in one horizontal period. Also, the scanning line 4 will be described. Before and after a time T11, the scanning line driving circuit 12 makes a predetermined scanning line 4 active, and the TFTs connected to the scanning line 4 are turned on, and the display signals R, G and B sent to the data lines 5 and 6 are written to the pixels 7. Then, after a time T12, the scanning line 4 is made inactive, the TFTs are turned off, and the display signals R, G and B sent to the data lines 5 and 6 are held in the pixels 7. The period until the scanning line 4 is made inactive after the time T12 reserves the period when the pixel 7 arrives at the target voltage. Between the times T13 and T24 on the second scanning line in the first frame, the polarity switching switch 39 is turned on, and the gray scale voltages selected by the DAC_Ps 26-1 and 26-2 are supplied to the buffers 24-2 and 24-4, respectively, and the gray scale voltages selected by the DAC_Ns 27-1 and 27-2 are supplied to the buffers 24-1 and 24-3, respectively. Hereinafter, a period between the times T13 and T24 is similar to the period between the times T1 and T12, as mentioned above. Then, the portions from the data lines 6 (B2) and 5 (R3) to the data lines 5 (R1) and 6 (B4) are sequentially driven.

As for the polarity switching switches 38 and 39, the polarity switching switch 39 is turned on in the first scanning line in the second frame, and the polarity switching switch 38 is turned on in the second scanning line in the second frame. With regard to the polarity switching switches, the operation between the first and second frames is repeated on and after the third frame.

Figure 14:
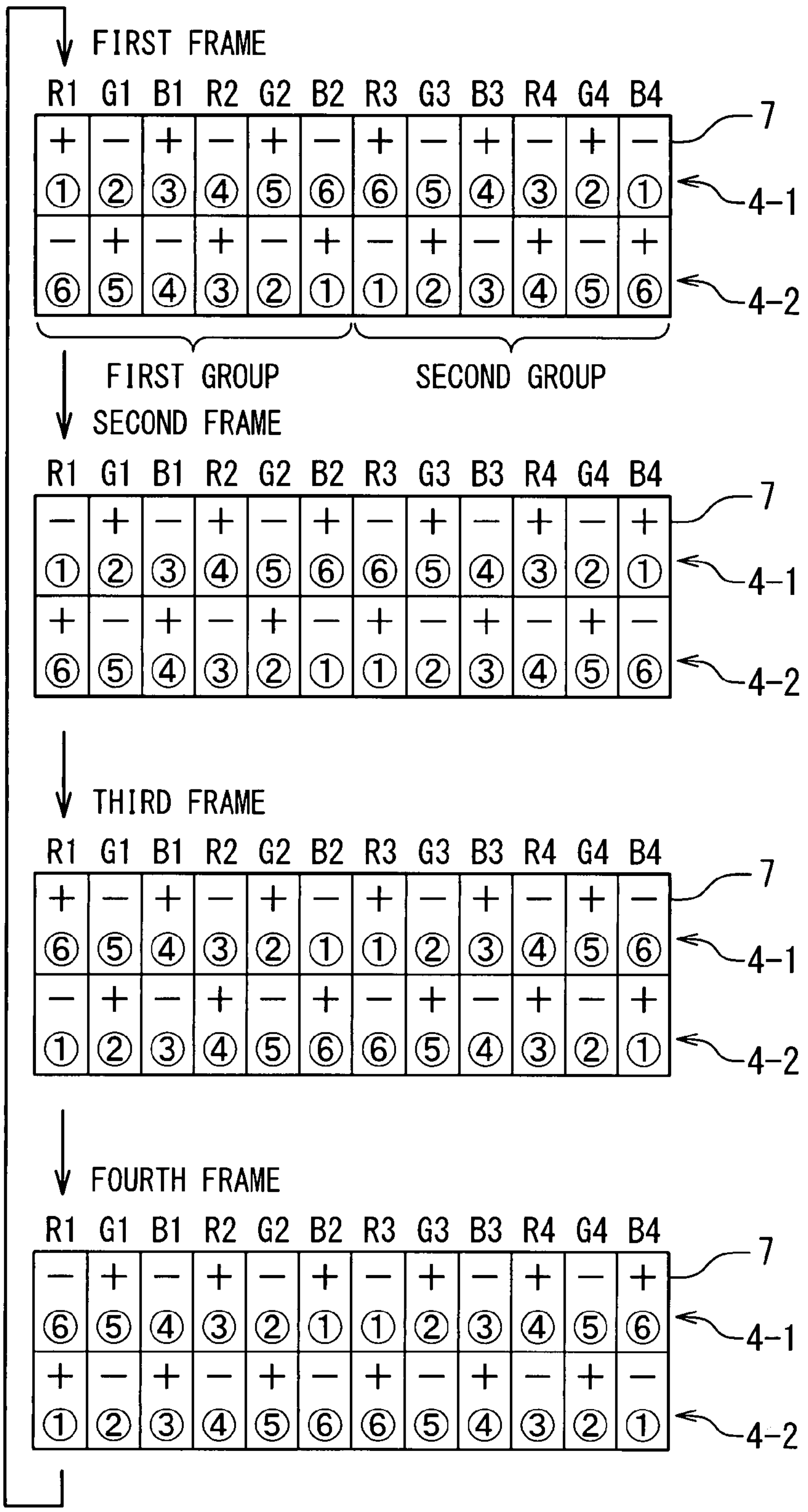
FIG. 14 is a conceptual diagram showing a write order of pixels of the data line driving circuit in the third embodiment.

The display unevenness results from not only the voltage variation caused by the coupling capacitance of the adjacent data line, but also the leak of the TFT and the leak in the time divisional switch group 40C. Thus, the write order is preferred to be changed for each frame. One example of the write order of the display signals to the pixel 7 will be described below with reference to FIG. 14. FIG. 14 is a conceptual diagram showing the write order to the pixel 7 on the adjacent scanning lines 4-1 and 4-2 from the first frame to the fourth frame. The symbol (for example, R1) on each pixel 7 is the symbol corresponding to the display signal written to the pixel 7, and the number inside the pixel 7 indicates the write order, and the + or − symbol indicates the polarity of the written signal. For example, in the first and second frames on the first scanning line of FIG. 14, the first group is driven in the order starting from the left side, and the second group is driven in the order starting from the right side. In the third and fourth frames, the first group is driven in the order starting from the left side, and the second group is driven in the order starting from the left side. On the second scanning line, in the first and second frames, the first group is driven in the order starting from the right side, and the second group is driven in the order starting from the left side. In the third and fourth frames, the first group is driven in the order starting from the left side, and the second group is driven in the order starting from the right side.

That is, as shown in FIG. 14, as for the pixels 7 connected to the scanning line 4-1, in the first and second frames, when the drive order is represented by using the symbols of the display signals supplied to the data lines, the first group is driven in the order starting from R1, G1, B1, R2, G2, B2, and the second group is driven in the order of B4, G4, R4, B3, G3 and R3. Also, in the third and fourth frames, similarly, the first group is driven in the order of B2, G2, R2, B1, G1 and R1, and the second group is driven in the order of R3, G3, B3, B4, G4 and R4. As for the pixels 7 connected to the scanning line 4-2, in the first and second frames, similarly, the first group is driven in the order starting from B2, G2, R2, B1, G1 and R1, and the second group is driven in the order of B3, G3, R3, B4, G4 and R4. Also, in the third and fourth frames, similarly, the first group is driven in the order of R1, G1, B1, R2, G2, B2, R3, G3 and B3, and the second group is driven in the order of R4, G4, B4, B3, G3 and R3.

Also, when the pixels 7 on the data line 5 (R1) on the first scanning line are assumed such as "Polarity and Order of First Frame", "Polarity and Order of Second Frame", "Polarity and Order of Third Frame", and "Polarity and Order of Fourth Frame", they are driven in the order of [+1, −1, +9, −9] in FIG. 14. However, they may be driven in the order of [+1, −6, +6, −1]. The other pixels 7 are similar.

As mentioned above, according to the data line driving driver 10 based on the present invention, the drive timing of the data lines is suitably controlled, which can suppress the coupling capacitance between the data lines. Thus, in order to suppress the coupling capacitance, the wiring interval between the data lines is not required to be wide, which can reduce the circuit area. Also, the time divisional switches connected to the data lines are used to selectively drive the data lines. Thus, even if for at least two colors, the gamma compensation is performed independently of each other, the gray scale voltage generating circuit is not required to be provided for each color inside the gray scale voltage generating circuit. Therefore, while the chip area is reduced, the display irregularity of the display apparatus 100 in the time division drive can be improved.

As mentioned above, the embodiments of the present invention have been described in detail. However, the specific configurations are not limited to the above-mentioned embodiments. Even the modification in the range without departing from the spirit and scope of the present invention is included in the present invention.

Although the inventions has been described above in connection with several preferred embodiments thereof, it will be appreciated by those skilled in the art that those embodiments are provided solely for illustrating the invention, and should not be relied upon to construe the appended claims in a limiting sense.

What is claimed is:

1. A data line driving circuit comprising:

a first buffer circuit configured to drive a data line;

a second buffer circuit configured to drive a data line;

wherein n first data lines (n is a natural number larger than 1), and m second data lines (m is a natural number larger than 1) are alternately arranged in units of data lines as a group;

a first switch circuit configured to select one of said n first data lines in a first ON period and to connect said selected first data line with said first buffer circuit; and a second switch circuit configured to select one of said m second data lines adjacent to said selected first data line in a second ON period and to connect said selected second data line with said second buffer circuit.

2. The data line driving circuit according to claim 1, wherein said first switch circuit comprises n switches provided to connect said n first data lines to said first buffer circuit in response to n switch control signals, respectively, and said second switch circuit comprises m switches provided to connect said m second data lines to said second buffer circuit in response to m switch control signals, respectively.

3. The data line driving circuit according to claim 2, wherein said n first data lines and said m second data lines of said group are driven in a predetermined order.

4. The data line driving circuit according to claim 3, wherein a first driven data line of said group is driven in a first period, and an (n+m)-th driven data line of said group is driven in a first period and an (n+m)-th period.

5. The data line driving circuit according to claim 4, wherein an (n+m)-th driven data line of said group is driven at a timing prior to said first driven data line in said first period.

6. The data line driving circuit according to claim 2, wherein there are a plurality of said groups, and a first driven data line in a first group of said plurality of groups is adjacent to an (n+m)-th driven data line in a second group of said plurality of groups.

7. The data line driving circuit according to claim 2, wherein there are a plurality of said groups, an (n+m)-th driven data line in a first group of said plurality of groups is adjacent to an (n+m)-th driven data line in a second group of said plurality of groups, and a color corresponding to a display signal supplied to said (n+m)-th driven data line in said first group is different from a color corresponding to a display signal supplied to said (n+m)-th driven data line in said second group.

8. The data line driving circuit according to claim 2, wherein n+m is a multiple of 3, and said first and second buffer circuits output display signals corresponding to different colors to said selected first and second data lines in an ON period overlapping between said first and second ON periods.

9. The data line driving circuit according to claim 1, wherein said first buffer circuit drives said selected first data line at least two times in a one horizontal period.

10. A data line driving method comprising:

connecting a selected one of n first data lines (n is a natural number larger than 1) and a first buffer circuit by one of first switches;

connecting a selected one of m second data lines adjacent to said selected first data line and a second buffer circuit by one of second switches;

wherein said n first data lines and said m second data lines are alternately arranged as a group in units of data line;

driving said selected first data line by said first buffer circuit; and driving said selected second data line by said second buffer circuit.

11. The data line driving method according to claim 10, wherein said first ON period and said second ON period partially overlap with each other.

12. The data line driving method according to claim 10, wherein said n first data lines and said m second data lines of said group is driven as a first driven data line to an (n+m)-th driven data line in a predetermined order during periods from a first ON period to an (n+m)-th ON period.

13. The data line driving method according to claim 12, wherein there are a plurality of said groups, and said first driven data line in a first group of said plurality of groups is adjacent to said (n+m)-th driven data line in a second group of said plurality of groups.

14. The data line driving method according to claim 13, wherein a color corresponding to a display signal supplied to said (n+m)-th driven data line in said first group is different from a color corresponding to a display signal supplied to said (n+m)-th driven data line in said second group.

15. The data line driving method according to claim 10, wherein n+m is a multiple of 3, and said first and second buffer circuits output display signals corresponding to different colors to said selected first and second data lines in an ON period overlapping between said first and second ON periods.

16. A display apparatus comprising:

a display panel comprising n first data lines (n is a natural number larger than 1), and m second data lines (m is a natural number larger than 1) alternately arranged in units of data lines as a group in a display region; and a data line driving circuit configured to drive said group of said n first data lines and said m second data lines, wherein said data line driving circuit comprises:

a first buffer circuit configured to drive a data line;

a second buffer circuit configured to drive a data line;

a first switch circuit configured to select one of said n first data lines in a first ON period and to connect said selected first data line with said first buffer circuit; and a second switch circuit configured to select one of said m second data lines adjacent to said selected first data line in a second ON period and to connect said selected second data line with said second buffer circuit.

17. The display apparatus according to claim 16, wherein said first switch circuit comprises n switches provided to connect said n first data lines to said first buffer circuit in response to n switch control signals, respectively, and said second switch circuit comprises m switches provided to connect said m second data lines to said second buffer circuit in response to m switch control signals, respectively.

18. The display apparatus according to claim 16, wherein said n first data lines and said m second data lines of said group are driven as a first driven data line to an (n+m)-th driven data line in a predetermined order.

19. The display apparatus according to claim 18, wherein said first driven data line of said group is driven in a first period, and an (n+m)-th driven data line of said group is driven in a first period and an (n+m)-th period.

20. The display apparatus according to claim 19, wherein an (n+m)-th driven data line of said group is driven at a timing prior to said first driven data line in said first period.

21. The data line driving circuit according to claim 18, wherein a first driven data line in a first group of a plurality of said groups is adjacent to an (n+m)-th driven data line in a second group of said plurality of groups.

22. The data line driving circuit according to claim 18, wherein a color corresponding to a display signal supplied to said (n+m)-th driven data line in a first group of a plurality of said groups is different from a color corresponding to a display signal supplied to said (n+m)-th driven data line in a second group of said plurality of groups.

* * * * *